(12) United States Patent
Sung et al.

(10) Patent No.: US 11,551,315 B2
(45) Date of Patent: Jan. 10, 2023

(54) SYSTEMS AND METHODS FOR COMPUTING TRAVEL OPTIONS

(71) Applicant: MASTERCARD INTERNATIONAL INCORPORATED, Purchase, NY (US)

(72) Inventors: Yuan-Jiun L. Sung, San Francisco, CA (US); Sahana Swaminathan, San Francisco, CA (US); Daniel Guillermo, San Francisco, CA (US); Maria Alcaraz Ochoa, San Francisco, CA (US); Hsiao-Tieh Hsu, San Leandro, CA (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 17/137,114

(22) Filed: Dec. 29, 2020

(65) Prior Publication Data

US 2022/0207629 A1 Jun. 30, 2022

(51) Int. Cl.
*G06Q 30/02* (2012.01)
*G06Q 50/14* (2012.01)
(Continued)

(52) U.S. Cl.
CPC ........... *G06Q 50/14* (2013.01); *G06Q 20/085* (2013.01); *G06Q 30/018* (2013.01); *G06Q 30/0226* (2013.01)

(58) Field of Classification Search
CPC .. G06Q 50/14; G06Q 30/0226; G06Q 30/018; G06Q 20/085
See application file for complete search history.

(56) References Cited

U.S. PATENT DOCUMENTS 8,121,780 B2 2/2012 Gerdes et al.
9,228,841 B2 1/2016 Dutta et al.
(Continued)

FOREIGN PATENT DOCUMENTS

WO 201720953 A1 12/2017

OTHER PUBLICATIONS

"Google Unveils 'Green' Maps feature to encourage low-carbon travel" (published on Sep. 4, 2019 at https://www.edie.net/news/8/Google-unveils--green--Maps-feature-to-encourage-low-carbon-travel/ ) (Year: 2019).*

(Continued)

*Primary Examiner* — James M Detweiler
(74) *Attorney, Agent, or Firm* — Armstrong Teasdale LLP

(57) ABSTRACT

A transit computing (TC) system for determining travel options is provided. The TC system includes at least one TC device including at least one processor communicatively coupled to a database configured to receive a request including trip data including a start location and an end location. The at least one processor is also configured to determine at least one travel option, wherein each travel option is associated with a mode of travel, and determine, for each travel option, at least one projected environmental trip detail, including a respective projected emissions output for each travel option. The at least one processor is further configured to receive user selection of a selected travel option and process, based on the user selection, at least one transaction associated with the selected travel option, wherein the at least one transaction includes a payment and confirmation, sent to the user computing device, of the payment.

17 Claims, 13 Drawing Sheets

(51) Int. Cl.
    *G06Q 20/08*     (2012.01)
    *G06Q 30/00*     (2012.01)

(56) References Cited

U.S. PATENT DOCUMENTS

| | | | |
|---|---|---|---|
| 9,596,359 B2 * | 3/2017 | Carlson | G06Q 50/30 |
| 9,689,693 B2 | 6/2017 | Newlin et al. | |
| 10,914,600 B1 * | 2/2021 | Spielman | G06Q 30/0284 |
| 2009/0287408 A1 * | 11/2009 | Gerdes | G01C 21/3423 |
| | | | 701/533 |
| 2010/0280853 A1 * | 11/2010 | Petralia | G06Q 10/02 |
| | | | 705/13 |
| 2011/0099100 A1 * | 4/2011 | Onishi | G01C 21/3469 |
| | | | 705/37 |
| 2012/0209522 A1 * | 8/2012 | Gollnick | G01C 21/3423 |
| | | | 701/527 |
| 2016/0298977 A1 * | 10/2016 | Newlin | G01C 21/3679 |
| 2017/0186114 A1 * | 6/2017 | Bongiovi | G06Q 10/02 |
| 2017/0193614 A1 * | 7/2017 | Kalyanaraman | G06Q 50/14 |
| 2018/0046958 A1 * | 2/2018 | Cauwenberghs | G06Q 30/0284 |
| 2018/0374112 A1 * | 12/2018 | Sharan | G06Q 30/0207 |

OTHER PUBLICATIONS

"The App that Pays you to Find a Smarter Commute" (Poon, Linda Published on Sep. 10, 2018 at https://www.bloomberg.com/news/articles/2018-09-10/can-gamifying-public-transit-change-commuters-habits#:~:text=The%20App%20That%20Pays%20You,ways%20to%20get%20to%20work) (Year: 2018).*

* cited by examiner

SYSTEMS AND METHODS FOR COMPUTING TRAVEL OPTIONS

BACKGROUND OF THE INVENTION

The field of the invention relates generally to a transit computing system and, more specifically, to systems and methods for computing travel options based at least in part on a projected environmental impact of each travel option.

Some service providers offer systems and methods for guiding a user in their transportation needs by, for example, recommending to the user a route that covers the shortest distance between two locations or that takes the least amount of travel time. Further, some known systems and methods provide estimated carbon emissions data based on a user's path of travel and/or travel method. However, these systems and methods do not provide an all-in-one service wherein a user trip is planned, environmental impact data is provided, and associated user transactions associated with a selected travel plan are processed via the same system.

Today, as concerns heighten about the environment and people's impact on the environment, many consumers want to understand what impact their actions may have on the environment. Many people are becoming more environmentally aware and are looking for ways to lessen their potentially negative impact on the environment. Thus, systems and methods for computing travel options with a projected environmental impact of each travel option are desired.

BRIEF DESCRIPTION OF THE INVENTION

In one aspect, a transit computing (TC) system for determining travel options is provided. The TC system includes at least one transit computing (TC) device including at least one processor communicatively coupled to a database. The at least one processor configured to receive, from a user computing device, a request including trip data associated with a user of the user computing device wherein the trip data includes a start location and an end location. The at least one processor is also configured to determine, in response to receiving the request, at least one travel option wherein each of the at least one travel options is associated with a respective mode of travel between the start location and the end location, and determine, for each of the at least one travel options, at least one projected environmental trip detail wherein the at least one projected environmental trip detail includes a respective projected emissions output for each at least one travel option. The at least one processor is further configured to cause to be displayed, on the user computing device, each of the at least one travel options and the determined at least one projected environmental trip detail, receive user selection of a selected travel option of the at least one travel option, and initiate, based on user selection, at least one payment transaction associated with the selected travel option wherein the at least one payment transaction includes transmission of payment account data, a payment for the selected travel option, and confirmation, sent to the user computing device, of the payment for the selected travel option.

In another aspect, a computer-implemented method for determining travel options is provided. The method is implemented by at least one transit computing (TC) device including at least one processor in communication with at least one database. The method includes receiving, from a user computing device, a request including trip data associated with a user of the user computing device wherein the trip data includes a start location and an end location, and determining, in response to receiving the request, at least one travel option wherein each of the at least one travel options is associated with a respective mode of travel between the start location and the end location. The method also includes determining, for each of the at least one travel options, at least one projected environmental trip detail wherein the at least one projected environmental trip detail includes a respective projected emissions output for each at least one travel option, and causing to be displayed, on the user computing device, each of the at least one travel options and the determined at least one projected environmental trip detail. The method further includes receiving user selection of a selected travel option of the at least one travel option, and initiating, based on the user selection, at least one payment transaction associated with the selected travel option wherein the at least one payment transaction includes transmission of payment account data, a payment for the selected travel option and confirmation, sent to the user computing device, of the payment for the selected travel option.

In yet another aspect a non-transitory computer-readable storage medium having computer-executable instructions embodied thereon is provided. When the computer-executable instructions are executed by at least one transit computing (TC) device that includes at least one processor in communication with at least one database, the computer-executable instructions cause the transit computing device to receive, from a user computing device, a request including trip data associated with a user of the user computing device wherein the trip data includes a start location and an end location. The computer-executable instructions also cause the TC device to determine, in response to receiving the request, at least one travel option wherein each of the at least one travel options is associated with a respective mode of travel between the start location and the end location, and determine, for each of the at least one travel options, at least one projected environmental trip detail wherein the at least one projected environmental trip detail includes a respective projected emissions output for each at least one travel option. The computer-executable instructions further cause the TC device to cause to be displayed, on the user computing device, each of the at least one travel options and the determined at least one projected environmental trip detail, receive user selection of a selected travel option of the at least one travel option, and initiate, based on the user selection, at least one payment transaction associated with the selected travel option wherein the at least one payment transaction includes transmission of payment account data, a payment for the selected travel option, and confirmation, sent to the user computing device, of the payment for the selected travel option.

BRIEF DESCRIPTION OF THE DRAWINGS

FIGS. 1A-12 show example embodiments of the systems and methods described herein.

FIG. 1A is a schematic diagram illustrating an example transit computing (TC) system for computing transit options with at least one projected environmental trip detail, processing user selection of an option, and rewarding the user based on the option chosen.

FIG. 2 is an example data flow diagram for generating travel options using the TC system shown in FIG. 1A.

FIG. 3 is an example data flow diagram illustrating the generation and provision of travel options to a user, as implemented using the TC system shown in FIG. 1A.

FIG. 4 is an example data flow diagram for redeeming a reward using the TC system shown in FIG. 1A.

FIG. 5 illustrates an example configuration of a user computing device that may be used with the TC system shown in FIG. 1A, in accordance with one embodiment of the present disclosure.

FIG. 6 illustrates an example configuration of a server computing device that may be used with the TC system shown in FIG. 1A.

FIG. 7 is a flow chart of an example method for computing travel options based at least in part on a projected environmental impact of each travel option.

FIG. 8 is a diagram of components of one or more example computing devices that may be used in the TC system shown in FIG. 1A.

FIG. 9 illustrates an example embodiment of a first user interface displayed on a user computing device, illustrating user input of trip data.

FIG. 10 illustrates an example embodiment of a second user interface displayed on a user computing device, illustrating user selection from a plurality of travel options.

FIG. 11 illustrates an example embodiment of a third user interface displayed on a user computing device, illustrating a user selection from a plurality of rewards.

FIG. 12 illustrates an example embodiment of a fourth user interface displayed on a user computing device, illustrating confirmation of a reward selected by a user.

DETAILED DESCRIPTION OF THE INVENTION

Figure 1A:
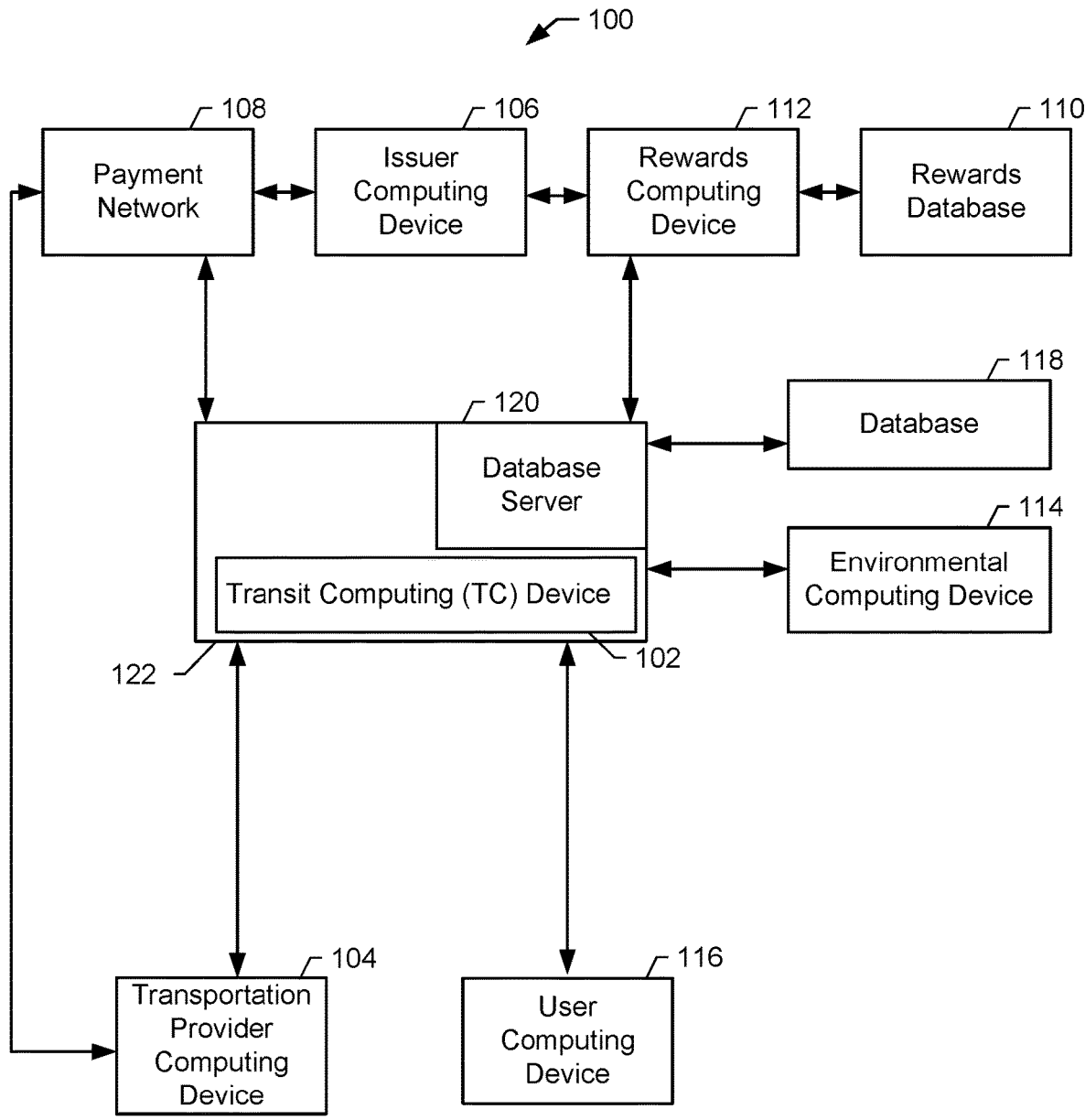

The following detailed description illustrates embodiments of the disclosure by way of example and not by way of limitation. The description enables one skilled in the art to make and use the disclosure. It also describes several embodiments, adaptations, variations, alternatives, and uses of the disclosure, including what is presently believed to be the best mode of carrying out the disclosure.

In an example embodiment, a transit computing (TC) system is configured to provide a TC service that is described further herein. The TC system includes at least one TC device in communication with: (i) at least one transportation provider computing device, (ii) at least one issuer computing device via a payment network, (iii) at least one rewards database, (iv) at least one environmental computing device, and/or (v) at least one user computing device.

The TC service enables a user to select a travel option for a trip based at least in part on a projected environmental impact (e.g., projected carbon emissions) of the trip. After entering a current location and desired destination, the user will be provided with a plurality of travel options including a variety of travel modes. Each travel option displayed to the user will be associated with at least one projected environmental detail, which may include a projected environmental impact. The user will then be able to select and pay for the selected travel option with the least environmental impact, or a different travel option if so desired, within the same TC system. Confirmation of the selected travel option, which may include a ticket or receipt, is then provided to the user by the TC system. Accordingly, a user can request, select, pay for, and receive confirmation of a trip all within the same TC system, while also being able to identify one or more environmentally friendly travel options from a plurality of travel options.

In the example embodiment, a user or customer may register (e.g., sign up) with the TC service via a network (e.g., Internet network) using their user computing device (e.g., smartphone, laptop, tablet, etc.). The customer may access the TC service via a website or a software application (collectively referred to herein as a TC application) stored and/or executed on the user computing device. The TC application is provided by the TC device and may include computer-executable code that is downloadable by the user computing device to establish communication with other components of the TC system (e.g., the TC device, one or more transportation provider computing devices, a rewards computing device, etc.). Once the customer accesses the TC service, the customer may register for the service by inputting registration data. The registration data may also be input by the customer as part of a trip purchasing process, as described below.

The registration data may include, among other data, a customer identifier, customer authentication credentials, also referred to herein as login data (e.g., customer name, password, biometric data, security questions, security answers, or the like), customer account data (e.g., primary account number (PAN), bank identification number (BIN), or other user account related information), a user computing device identifier, a customer email address, a customer home address, a customer work address, a customer phone number, and/or other data associated with the customer. Once the customer is registered with the TC service, the customer may use the TC service to request and select travel options provided by transportation providers via the TC app.

In some embodiments, the registration data is anonymized and/or aggregated (e.g., by the user computing device) prior to receipt by the TC device (i.e., no personally identifiable information (PII) is received by the TC device). In other embodiments, the TC device may be configured to receive registration data not yet anonymized, and may be configured to anonymize and/or aggregate the registration data. In such embodiments, any PII received by the TC device is received and processed in an encrypted format, or is received with the consent of individuals with which the PII is associated. In situations in which the systems discussed herein collect personal information about individuals including customers, or may make use of such personal information, individuals may be provided with an opportunity to control whether such information is collected or to control whether and/or how such information is used. In addition, certain data may be processed in one or more ways before it is stored or used, so that personally identifiable information is removed.

In the example embodiment, a transportation provider (e.g., a merchant such as a train operating merchant, a ride-sharing service, a provider of bike or scooter sharing, a taxi service, an airline operator, and the like) may also register with the TC service via a network using a transportation provider computing device. In some embodiments, the transportation provider computing device may be similar to the user computing device. In other embodiments, the transportation provider computing device may be a point-of-sale (POS) terminal. The transportation provider may access the TC service via the TC application stored and/or executed on the transportation provider computing device. The TC application is provided by the TC device, which configures the TC application and may include computer-executable code that is downloadable by the transportation provider computing device to establish communication with one or more user computing devices and/or other components of the TC system. Once the transportation provider accesses the TC service, the transportation provider may register for the TC service by inputting merchant or provider data. Once the transportation provider is registered with the TC service, the transportation provider may provide travel options to users via the TC app.

In the example embodiment, once the customer is registered with the TC service, the customer may purchase tickets or trips from a transportation provider using the TC service. In this example, the customer initiates the purchase by accessing the TC service via, for example, the TC application. The customer may initiate the purchase by inputting login data and trip data to the TC application. For example, the customer may input login data including a username, a password, biometric data, and/or other information associated with the customer for authentication by the TC device against previously submitted registration data of the customer. The customer may also input trip data including a number of trips, the departure location, the destination location, the transportation provider identification, the date and time of departure, and/or other information related to the trip. The login data and trip data are transmitted by the user computing device to the TC device.

The TC device is configured to transmit trip data to at least one transportation provider computing device, receive travel option data representing travel options available from the at least one transportation provider computing device, and compile the travel option data. It should be recognized that each travel option compiled by the TC device may include one or more modes of travel. For example, one travel option may include taking a taxi, then a subway, then a bus, until the user arrives at their final destination. A mode of travel may include any form of travel including at least car, bike, scooter, plane, bus, train, taxi or rideshare, boat, ferry, walking, and any other form of travel.

Further, the TC device is configured to transmit the travel option data to the environmental computing device, wherein the environmental computing device calculates a projected environmental trip detail for each travel option represented by the travel option data. For example, a projected environmental trip detail may include projected carbon dioxide emissions data for the respective travel option. The environmental computing device may reference an index when performing carbon dioxide emissions calculations, such as the Aland-Index. In some alternative embodiments, the TC device may perform emissions calculations without being in communication with an environmental computing device. In some embodiments, the TC device may perform emissions calculations by requesting and receiving environmental data from a reference database (e.g., the Aland-Index).

The TC device is additionally configured to generate enhanced travel data by associating the environmental trip details with the travel options and ranking or sorting the travel options in order of least projected environmental impact to most projected environmental impact. The TC device transmits the enhanced travel data, including the sorted travel options, to the user computing device for displaying thereat, in the sorted order with the associated environmental trip details (e.g., projected carbon emissions) displayed alongside the sorted travel options. This displayed format may enable a user to easily identify and select a more environmentally friendly travel option. In some cases, the TC device is configured to associate each travel option with an environmental impact indicator based upon the environmental trip details and/or the relative rank of each travel option. The environmental impact indicator may be, for example, a highlight of relatively environmentally friendly travel options in the color green, while less environmentally friendly travel options may be highlighted in yellow, and even less environmentally friendly travel options may be highlighted in red at a user computing device. The environmental impact indicator may additionally or alternatively include an icon (e.g., one or more leaves). In some embodiments, the environmental impact indicator may only display the most environmentally friendly options (e.g., the "top three" travel options, or only travel options that have a projected carbon dioxide emission below a predetermined threshold).

The user may then select a travel option at their user computing device. Upon user selection of a travel option, travel selection data associated with the selected travel option is transmitted from the user computing device to the TC device. Travel selection data may include, among other data, a trip distance, a date and time for the trip associated with the selected travel option, a duration of the trip, and/or transaction data including a transaction amount (e.g., fare fee, a purchase amount), a time and date of the transaction, customer account data (e.g., a primary account number (PAN)), customer biometric data (e.g., native or hashed version of biometric data), a customer identifier, a merchant identifier and/or a transportation provider computing device identifier associated with the provider of the selected travel option, a location of the point-of-sale of the transaction, an authentication request message, an authorization request message, a user computing device identifier, and/or other data associated with the payment transaction.

In the example embodiment, when a travel option is selected and the associated trip is purchased, the trip may be validated at the time of purchase by the transportation provider computing device associated with the travel option. It should be recognized that the trip may be validated by more than one transportation provider computing device in embodiments where the selected travel option includes more than one mode of transportation.

The user computing device is configured to transmit travel selection data, including transaction data as described above, to the TC device. Once the TC device receives the travel selection data, the TC device is configured to parse the travel selection data to identify the transaction data, which is transmitted by the TC device to a payment card interchange network for processing the purchase (e.g., the transaction). The transaction data may be transmitted in the form of an authorization request message over a payment card interchange network (e.g., ISO 8583 or 20022 message). In response to transmitting the authorization request message, the TC device receives an authorization response message from the issuer bank via the payment card interchange network. The TC device transmits the authorization response message to the transportation provider computing device and/or to the user computing device to complete the payment transactions associated with the selected travel route.

In embodiments where more than one mode of transportation is included in the selected travel option, the TC device is configured to transmit the authorization response message to each transportation provider computing device associated with the selected travel option. In these embodiments, the TC device may be configured to transmit separate authorization requests wherein each separate authorization request is associated with each different transportation provider associated with the travel option. The separate authorization requests may be for different values that add up to the total cost to be paid by the user. For example, the total cost of a trip may be $50, wherein a taxi ride costs $40 and a bus ride costs $10. In this example, two separate authorization requests would be generated by the TC device. One would be a $40 authorization request associated with the taxi ride, and the other would be a $10 authorization request associated with the bus ride.

In the example embodiment, the TC device is configured to receive a purchase amount from at least one transportation provider computing device. In other embodiments, the TC device may be configured to compute the purchase amount of a trip using the travel selection data. In other embodiments, the TC device may be configured to compute the purchase amount for each of a plurality of travel options using the trip data. In some embodiments, upon receipt of a travel selection by the user, the TC device is configured to transmit the computed purchase amount to the payment card interchange network (e.g., as an authorization request) for processing the purchase as described above. In other embodiments, the TC device is configured to periodically transmit the computed purchase amount for a plurality of trips purchased by a customer during a predefined period of time (e.g., a few hours, a day, few days, a week, etc.).

At least some of the technical problems addressed by this system includes: (a) less environmentally friendly travel options continuing to be used despite alternative travel options that produce less carbon emissions; (b) a user wanting to use a more environmentally friendly travel option but not knowing which travel options are available for a given trip they desire to take; and (c) if a user compares environmental emissions data for travel options, they currently cannot purchase the trip in the same all-in-one system wherein travel options, including projected environmental impact data, can be compared by a user and then purchase of a selected travel option can be processed.

A technical effect of the systems and processes described herein is achieved by performing at least one of: (a) receiving, from a user computing device, a request including trip data associated with a user of the user computing device, wherein the trip data comprises a start location and an end location; (b) determining, in response to receiving the request, at least one travel option, wherein each at least one travel option is associated with a respective method of travel between the start location and the end location; (c) determining, for each at least one travel option, at least one projected environmental trip detail, wherein the at least one projected environmental trip detail comprises a respective projected emissions output for each at least one travel option; (d) causing to be displayed, on the user computing device, each at least one travel option and the associated at least one projected environmental trip detail; (e) receiving user selection of a selected travel option of the at least one travel option; and (f) processing, based on the user selection at least one transaction associated with the selected travel option, wherein the at least one transaction comprises a payment for the selected travel option and confirmation, sent to the user computing device, of the payment for the selected travel option.

The technical effects and advantages achieved by this system include at least one of: (a) reducing carbon emissions by encouraging and offering environmentally friendly methods of transportation; (b) creating a unified transit ecosystem; and (c) offering an all-in-one service wherein a user trip is planned, environmental impact data is provided, and user transactions are processed via the same system.

In one embodiment, a computer program is provided, and the program is embodied on a computer-readable medium. In an example embodiment, the system is executed on a single computer system, without requiring a connection to a server computer. In a further example embodiment, the system is run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Apple Inc. located in Cupertino, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "location" refers to tracking a customer location as collected from a user computing device's location system, such as a global positioning system (GPS) sensor, and can include GPS coordinates, a street address, an IP address, geo-stamps on digital photographs, smartphone check-in or other data, and other location data provided as a result, for example, of a telecommunications or online activity of a customer using the user computing device. In some embodiments, the location of the user computing device may be determined using the device's location systems and may be supplemented and/or verified using cell tower info (e.g., cell "pings") and/or WI-FI router information (e.g., connected routers used by the user computing device). The user computing device may include a web-enabled phone (e.g., a "smartphone"), a personal digital assistant (PDA), a laptop computer, a cellular phone, a tablet, a phablet, or other web-based connectable equipment the customer may use to communicate with other computing devices.

As used herein, the term "database" may refer to either a body of data, a relational database management system (RDBMS), or to both. Further, "database" may refer to a cloud database (e.g., Microsoft Azure). A database may include any collection of data including hierarchical databases, relational databases, flat file databases, object-relational databases, object oriented databases, and any other structured collection of records or data that is stored in a computer system. The above examples are for example only, and thus, are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database implementation (e.g., relational, document-based) may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.).

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1A is a schematic diagram illustrating an example transit computing (TC) system 100 for computing travel options with at least one projected environmental trip detail, processing user selection of a travel option, and rewarding the user based on the selected travel option. TC system 100 includes at least one TC device 102 in communication with at least one transportation provider computing device 104, at least one issuer computing device 106 via a payment network 108, at least one rewards database 110 via at least one rewards computing device 112, at least one environmental computing device 114, and/or at least one user computing device 116.

In the example embodiment, user computing device 116 (e.g., a smartphone, laptop, tablet, etc.) is configured to receive user inputs from a user thereof regarding a requested trip (e.g., a starting location and end location, time of trip, etc.), display travel options, and receive user input of a selection travel option that a user has chosen for their trip.

In the example embodiment, TC device 102 is configured to receive data regarding various user inputs and selections from user computing device 116, transmit travel options to user computing device 116, and coordinate user selection of a travel option such that a user (e.g., the user associated with and/or operating user computing device 116) does not have to be in direct communication with another device (e.g., a plurality of transportation provider computing devices 104).

Issuer computing device 106 is associated with an issuer of a payment account that the user of user computing device 116 may use to initiate a purchase transaction for a trip.

In the example embodiment, transportation provider computing device 104 is configured to receive trip data (as input to user computing device by the user) from TC device 102, and respond by determining and transmitting travel option data indicating one or more travel options that are offered by the respective transportation provider based on the trip data.

In the example embodiment, environmental computing device 114 is configured to receive travel option data, from transportation computing device 104 via TC device 102, and determine projected emissions data for each received travel option. Environmental computing device 114 transmits enhanced travel option data, including a projected emissions data, to TC device 102 for processing and sorting.

Rewards computing device 112 is configured to process user-redemption of rewards and to store and/or access user reward data to/from rewards database 110. Rewards may be earned by, for example, a user choosing environmentally friendly travel options. More environmentally friendly travel options may be associated with more reward points than less environmentally friendly travel options. User reward data may include a number of reward points associated with a user and/or user account. Reward points may be redeemed for, for example, a variety of experiences, eco-friendly merchandise, commuter discounts, carbon-offsetting items (e.g., trees), and or sponsoring/"adopting" an endangered animal. In some embodiments, environmental computing device 114 and/or rewards computing device 112 may be integral to TC device 102 and/or the functions described herein with respect to environmental computing device 114 and/or rewards computing device 112 may be performed by TC device 102.

TC device 102 is further in communication with at least one database 118 that may store and/or process data, such as travel data, registration data, environmental data, and/or any other data described herein. TC device 102 may include a database server 120 that facilitates communication between TC device 102 and database 118. In one embodiment, database 118 is stored on TC device 102 and may be accessed by logging onto TC device 102 through user computing device 116 or transportation provider computing device 104. In an alternative embodiment, database 118 is stored remotely from TC device 102 and may be non-centralized.

In the example embodiment, a customer may register (e.g., sign up) with the TC service via a network (e.g., Internet network) using user computing device 116. The customer may access the TC service via a TC application. Once the customer accesses the TC service, the customer may register for the service by inputting registration data.

In the example embodiment, a transportation provider (e.g., a merchant) may also register (e.g., sign up) with the TC service via a network (e.g., an Internet network) using transportation provider computing device 104. In some embodiments, transportation provider computing device 104 may be similar to user computing device 116. In other embodiments, transportation provider computing device 104 may be a point-of-sale (POS) terminal. The transportation provider may access the TC service via a TC application. Once the transportation provider accesses the TC service, the transportation provider may register for the TC service by inputting merchant data.

In the example embodiment, once the customer and the transportation provider are registered with the TC service, the customer may purchase tickets or trips from the transportation provider using the TC service. In this example, the customer initiates the purchase by accessing the TC service via, for example, a TC application. The customer may initiate the purchase by inputting registration data and trip data into the TC application. For example, the customer may input registration data including a username, a password, biometric data, and/or other information associated with the customer for authentication by TC device 102 against previously submitted registration data of the customer. The customer may also input trip data including a number of trips, the departure location, the destination location, the transportation provider identification, the date and time of departure, and/or other information related to the trip. The inputted registration data and trip data are transmitted by user computing device 116 to TC device 102.

In the example embodiment, TC device 102 then transmits trip data to at least one transportation provider computing device 104 via, for example, an application programming interface (API). TC device 102 is also configured to, upon receipt of travel option data from at least one transportation provider computing device 104, compile and transmit travel option data to environmental computing device 114. The plurality of travel options may each be associated with an environmental trip detail, generated by environmental computing device 114. For example, the environmental trip detail may be projected carbon dioxide emissions data for each of the plurality of travel options. Environmental computing device 114 may reference an index when performing carbon dioxide emissions calculations, such as the Aland-Index. In some embodiments, TC device 102 may perform emissions calculations without being in communication with an environmental computing device 114. In yet further embodiments TC device 102 may perform emissions calculations upon requesting and receiving environmental data from a database 118 and/or index wherein the received environmental data will serve as at least one variable in the emissions calculations.

Figure 10:
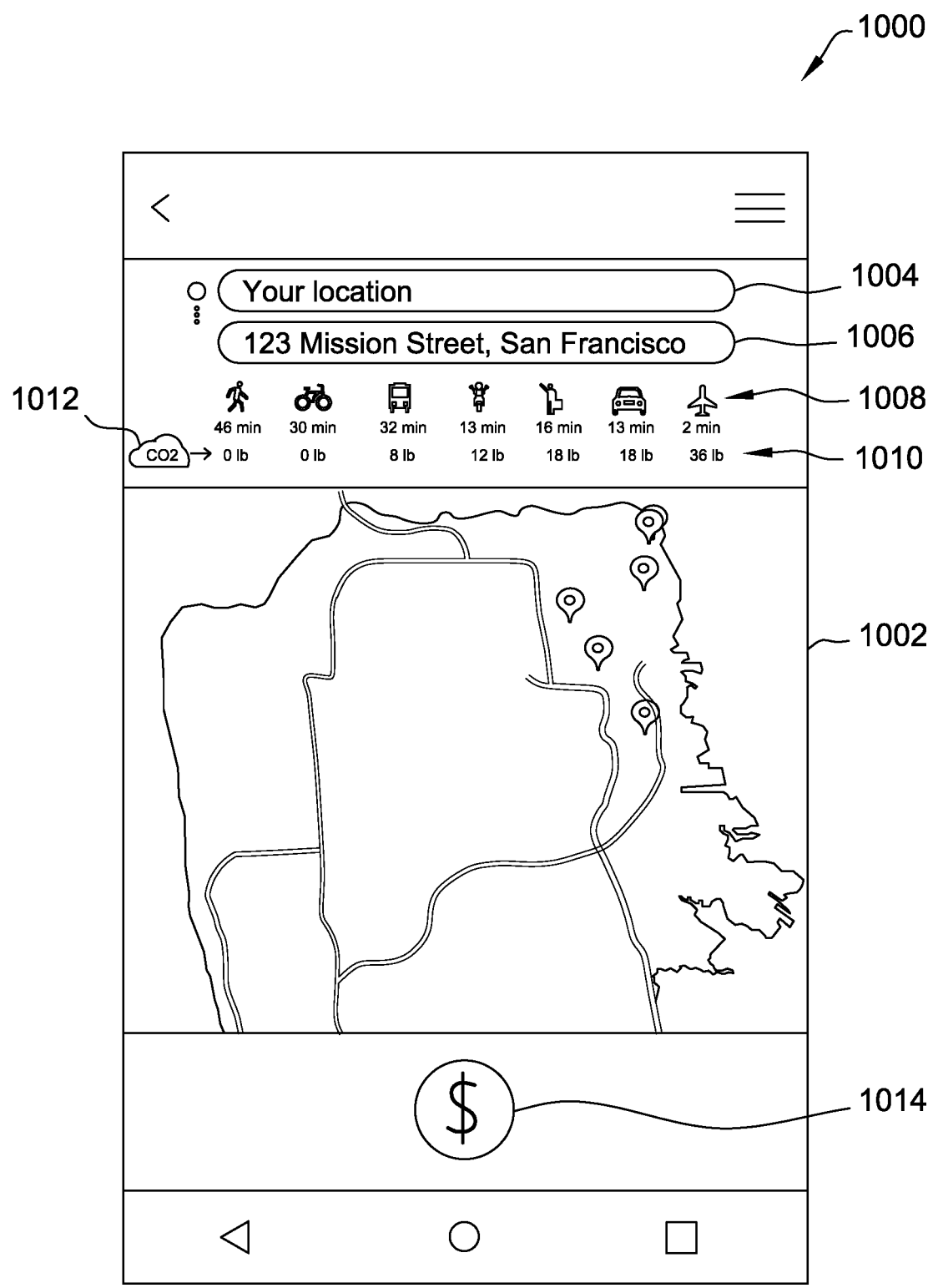

TC device 102 is additionally configured to compile enhanced travel data 210, including at least one projected environmental trip detail, in order of least projected environmental impact to most projected environmental impact (see, for example, FIG. 10). This will allow the option of easily choosing a more environmentally friendly travel option. Further, TC device 102 is configured to associate each travel option with an environmental impact indicator. The environmental impact indicator may be, for example, presenting relatively environmentally friendly travel options in the color green, while less environmentally friendly travel options may be in yellow, and even less environmentally friendly travel options may be displayed in red at user computing device 116.

The user then may select a travel option at user computing device 116, at which time TC device 102 completes and verifies any associated transactions via payment network 108 and issuer computing device 106. TC device 102 may then present, at user computing device 116, a confirmation of the trip. The confirmation may be, for example, a ticket provided by transportation provider computing device 104, and to be used to complete the user-selected trip. In embodiments where the selected travel option includes more than one mode of transportation, TC device 102 may present multiple confirmations at user computing device 116.

In the example embodiment, TC device 102 is configured to receive the cost of a trip from transportation provider computing device 104, using trip data, and particularly the destination location. In some embodiments, TC device 102 is configured to compute the purchase amount of the trip using trip data. TC device 102 is configured to transmit the computed purchase amount to payment network 108 for processing the purchase in response to receipt of travel selection data. In other embodiments, TC device 102 is configured to periodically transmit the total computed purchase amount for a plurality of trips purchased by a customer during a predefined period of time (e.g., a few hours, a day, a few days, a week, etc.). In other embodiments, the customer may use different transportation providers throughout the trip.

Figure 1B:
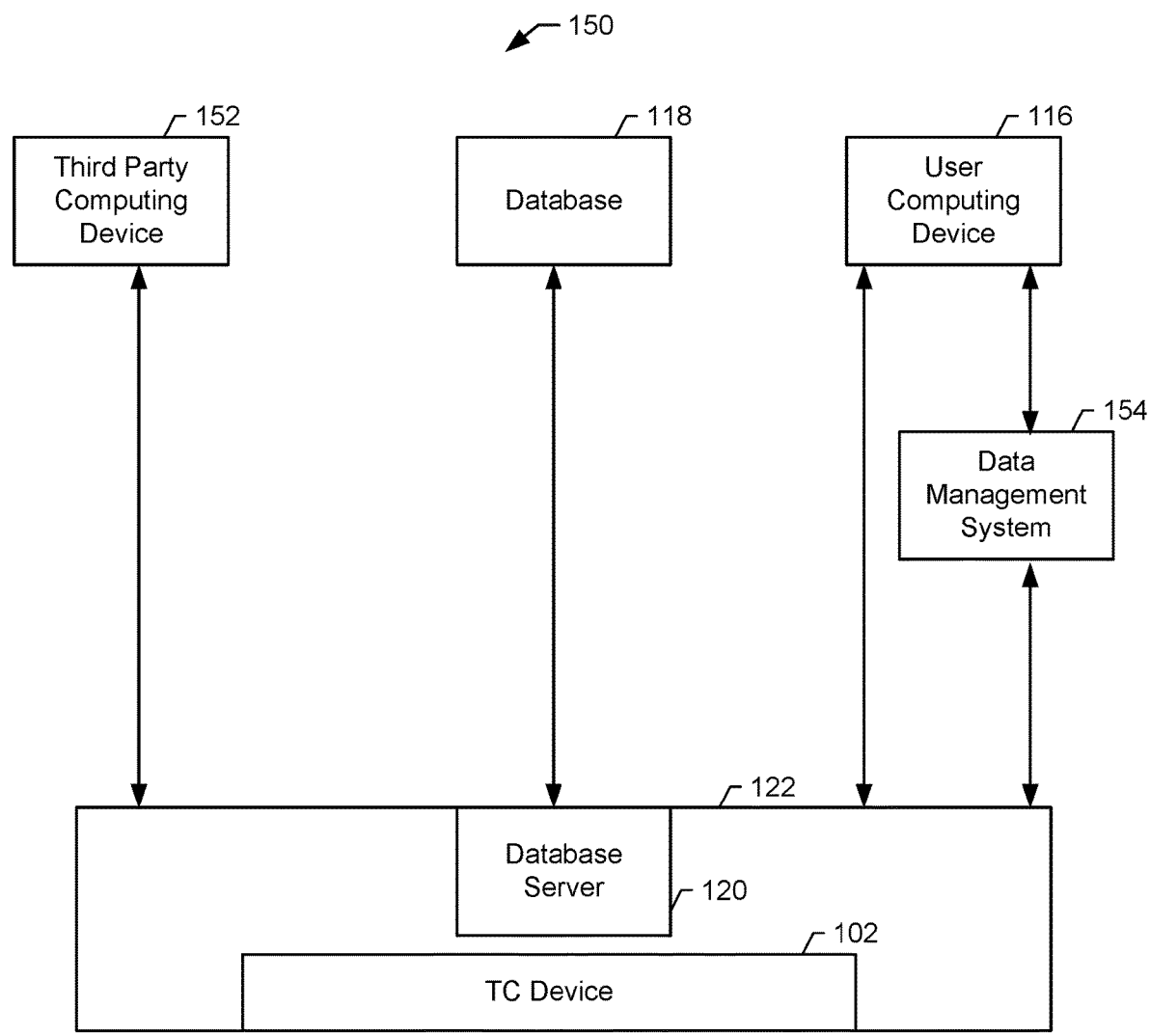
FIG. 1B is a schematic diagram illustrating an example embodiment of a data infrastructure for the TC system in accordance with the present disclosure.

FIG. 1B is a schematic diagram illustrating an example embodiment of a data infrastructure 150 for TC system 100 (shown in FIG. 1A) in accordance with the present disclosure. TC system 100 includes at least one TC device 102 in communication with at least one user computing device 116, at least one database 118, at least one third party computing device 152, and at least one data management system 154. TC device 102 may be implemented on at least one server 122. In some embodiments, TC device 102 may include database server 120 that facilitates communication between TC device 102 and database 118. At least one third party computing device 152 may include, for example, transportation provider computing device 104, issuer computing device 106, rewards computing device 112, and/or environmental computing device 114.

TC device 102 transmits and receives many forms of data as described herein (e.g., trip data 206, travel option data 208, etc.) from many different sources. Accordingly, TC device 102 may be configured to combine different forms of data into at least one "cube" of data in at least one "cluster" (e.g., a Hadoop cluster), and store the at least one cube of data in database 118. A cube of data may contain data regarding, for example, environmental impact details and/or rewards. TC device 102 may also be configured to perform data queries (e.g., Hive queries) and data reduction tasks (e.g., Python MapReduce jobs, extract transform load (ETL), and/or other analytics) to facilitate generating the at least one cube of data. Storing data as at least one cube of data increases the efficiency of TC device 102 in managing data, processing data, and transmitting data to other computing devices (e.g., third party computing device 152, user computing device 116, etc.).

In the embodiment shown in FIG. 1B, data management system 154 is configured to manage at least some data transmitted from user computing device 116 to TC device 102 and/or vice versa. Data management system 154 may include services, applications, and/or tools for, as examples, bundling and batching groups of data messages, ingesting data, and/or naming data (e.g., Kafka, Zookeeper, and/or Gobblin). For example, a large amount of data may be transmitted from at least one user computing device 114 to TC device 102 at any given time regarding any number of trips and/or users, including real-time data. Thus, data management system 154 is configured to manage data to provide better functionality and efficiency of TC system 100.

Some data transmitted between user computing device 116 and TC device 102, such as a user associated with user computing device 116 requesting to see how many reward points they have, may not need to be managed by data management system 154 and may be sent directly to TC device 102 via, as an example, web services (e.g., RESTFUL Web Services). Accordingly, TC device 102 is both in direct communication with user computing device 116 and in further communication with user computing device 116 via data management system 154.

In some embodiments, a similar data management system (not shown) to data management system 154 may facilitate communication between TC device 102 and database 118. For example, a data management system in communication with database 118 and TC device 102 may include at least one dump host for facilitating data transfer between TC device 102 and database 118. This process may be managed by a scheduling system (e.g., Cron or Airflow) that allows users to schedule, reschedule, and repeat tasks (e.g., daily or weekly).

Figure 2:
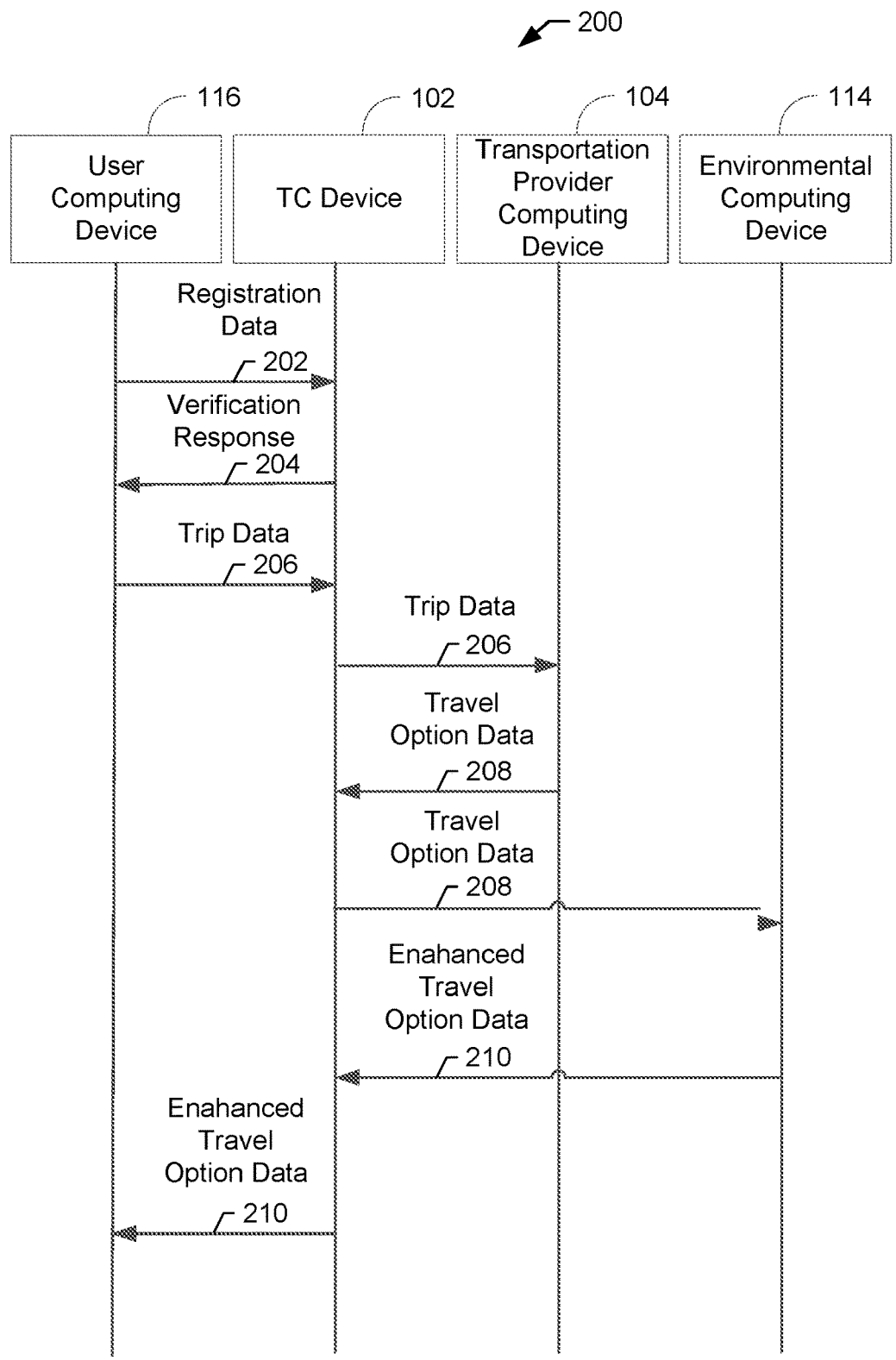

FIG. 2 is an example data flow diagram 200 illustrating the generation and provision of travel options to a user, as implemented using TC system 100 shown in FIGS. 1A and 1B. In the example embodiment, a customer logs in or registers with the TC service, as described above, by inputting registration data 202 to TC device 102 via user computing device 116. Registration data 202 may include, for example, a username, a password, biometric data, and/or other information. TC device 102 then transmits a verification response 204 to user computing device 116, wherein verification response 204 incudes a registration/login confirmation. The customer then inputs trip data 206 that is transmitted to TC device 102 via user computing device 116. Trip data 206 may include, for example, a trip distance, date and time for each customer trip, and duration of each customer trip. TC device 102 then transmits trip data 206 to at least one transportation provider computing device 104 via, for example, an application programming interface (API).

Each transportation provider computing device 104 responds by transmitting travel option data 208 to TC device 102. Travel option data 208 may include, for example, one or more travel options that can be provided by the transportation provider to satisfy the constraints of trip data 206. Travel option data 208 may also include an indication that a particular transportation provider cannot offer a travel option based on the trip data 206. TC device 102 then compiles travel option data 208 from all responding transportation provider computing devices 104, and transmits the compiled travel option data 208 to environmental computing device 114.

Environmental computing device 114 computes an environmental impact detail each travel option identified in travel option data 208, and transmits enhanced travel option data 210, which also includes the original travel option data 208 along with the associated environmental impact details, to TC device 102. For example, the environmental impact detail may be a projected amount of carbon dioxide emissions for each travel option. In some embodiments, TC device 102 may perform some or all of the functions described above (or elsewhere herein) as being performed by environmental computing device 114

TC device 102 is configured to then process and sort enhanced travel data 210, including travel option data 208 and the associated projected environmental trip details, in order of least projected environmental impact to most projected environmental impact (see, for example, FIG. 10). In other embodiments, TC device 102 may be configured to compile enhanced travel data 210 in order of least projected travel time to most projected travel time. In these other embodiments, TC device 102 may still be configured to display (as described further herein) at least one projected environmental impact detail with each travel option.

Further, in the example embodiment, TC device 102 is configured to associate each travel option with an environmental impact indicator. The environmental impact indicator may be, for example, presenting relatively environmentally friendly travel options in the color green, while less environmentally friendly travel options may be in yellow, and even less environmentally friendly travel options may be displayed in red at user computing device 116.

TC device 102 transmits enhanced travel option data 210, including the sorted travel option data 208 and associated environmental impact detail for each travel option, to user computing device 116 for display to the user thereof (e.g., within a user interface of the TC application). A user is then presented, at user computing device 116, with each travel option and the associated environmental impact detail (see, for example, FIG. 10).

Figure 3:
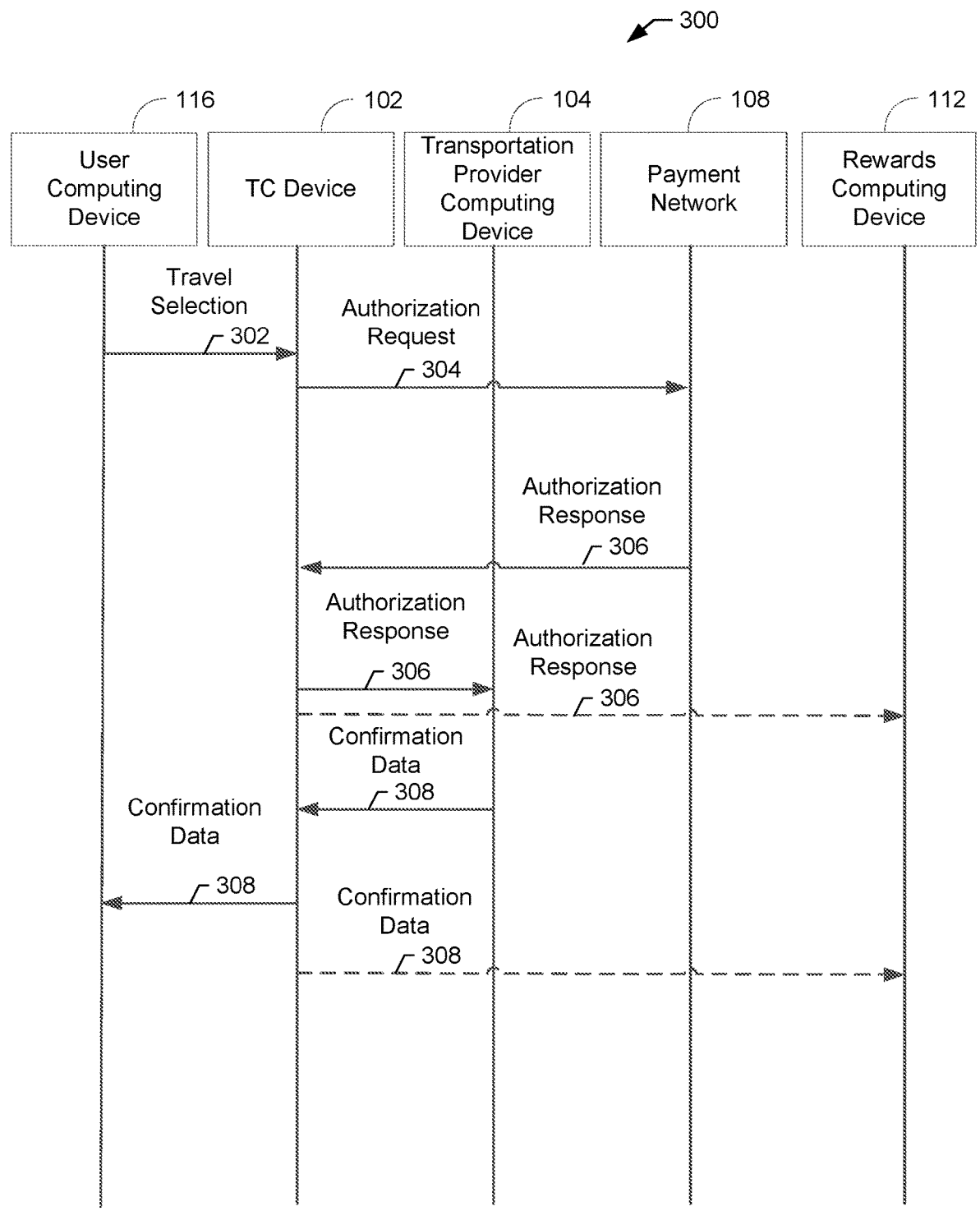

FIG. 3 is an example data flow diagram 300 for selecting a travel option using TC system 100 shown in FIGS. 1A and 1B. The user may select a travel option from one of the travel options presented at user computing device 116 based on enhanced travel option data 210. Subsequently, travel selection data 302, including the user-selected travel option, is transmitted from user computing device 116 to TC device 102. In the example embodiment, selection of the travel option includes a request to purchase a trip associated with the selected travel option.

Accordingly, upon receiving travel selection data 302, TC device 102 generates an authorization request 304, based on the travel selection data 302, and transmits authorization request 304 to payment network 108. Authorization request 304 may include transaction data, for example, a transaction amount (e.g., a fare fee, a purchase amount for a ticket, etc.), a time and date of the transaction, customer account data (e.g. a primary account number (PAN)), customer biometric data (e.g. native or hashed version of biometric data), a customer identifier, a merchant identifier, a transportation provider computing device identifier, a location of the point-of-sale of the transaction, a user computing device identifier, and/or other data associated with the payment transaction for the purchase of the trip. In some embodiments, payment network 108 may transmit authorization request 304 to issuer computing device 106 for processing (e.g., approval or denial of the transaction/purchase), and issuer computing device 106 generates an authorization response 306 that is transmitted to payment network 108. Payment network 108 then transmits authorization response 306 to TC device 102. Upon receiving authorization response 306, TC device 102 transmits authorization response 306 (and/or data representative thereof) to transportation provider computing device 104. Transportation provider computing device 104 then generates confirmation data 308, which is subsequently transmitted to user computing device 116 via TC device 102. Confirmation data 308 may include, for example, a ticket or receipt. In embodiments where more than one mode of transportation is included in the selected travel option, authorization response 306 is transmitted to a plurality of transportation provider computing devices 104, and confirmation data 308 may include a plurality of receipts and/or tickets (e.g. a bus pass, subway pass, airline ticket, etc.). Thereby, TC device 102, in communication with payment network 108 and transportation provider computing device 104, completes the transaction for a user after receiving travel selection data 302. The user does not need to separately access one or more transportation provider applications, for example, to review travel options and/or purchase a trip. In some embodiments, TC device 102 may transmit confirmation data 308 to rewards computing device 112, and rewards computing device 112 may be configured to grant reward points to a user upon receipt of confirmation data 308. In further embodiments, TC device 102 may transmit authorization response 306 (and/or data representative thereof) to rewards computing device 112, and rewards computing device 112 may be configured to grant reward points to a user upon receipt of authorization response 306.

In other embodiments, transportation provider computing device 104 may transmit travel confirmation data (not shown) to TC device 102 in order to confirm that a user completed a trip that had been purchased using the TC service. TC device 102 then transmits the travel confirmation data to rewards computing device 112. In some embodiments, rewards computing device 112 may only award reward points to a user upon receipt of the travel confirmation data. In further embodiments, rewards computing device 112 may award reward points to a user upon receipt of authorization request 304 (and/or data represented thereof, which may be transmitted to rewards computing device 112 by TC device 102). In still other embodiments, rewards computing device 112 may award reward points upon receipt of authorization request 304 and then reward additional points upon receipt of the travel confirmation data.

In the example embodiment, rewards computing device 112 awards reward points based at least on the projected environmental impact of the travel option selected by the user. For example, selecting a travel option with a lesser projected environmental impact may result in rewards computing device 112 awarding the user with more reward points than if the user had chosen a travel option with a greater projected environmental impact. Rewards computing device 112 may also be configured to communicate with TC device 102 to display reward icons (see, for example, FIG. 11) in the TC application that are associated with an amount of reward points a user has earned. Rewards computing device 112 may track accrued reward points for the user, as well as reward preferences and/or reward redemptions, in rewards database 110. In some embodiments, TC device 102 may perform some or all of the functions described above (or elsewhere herein) as being performed by rewards computing device 112.

Figure 4:
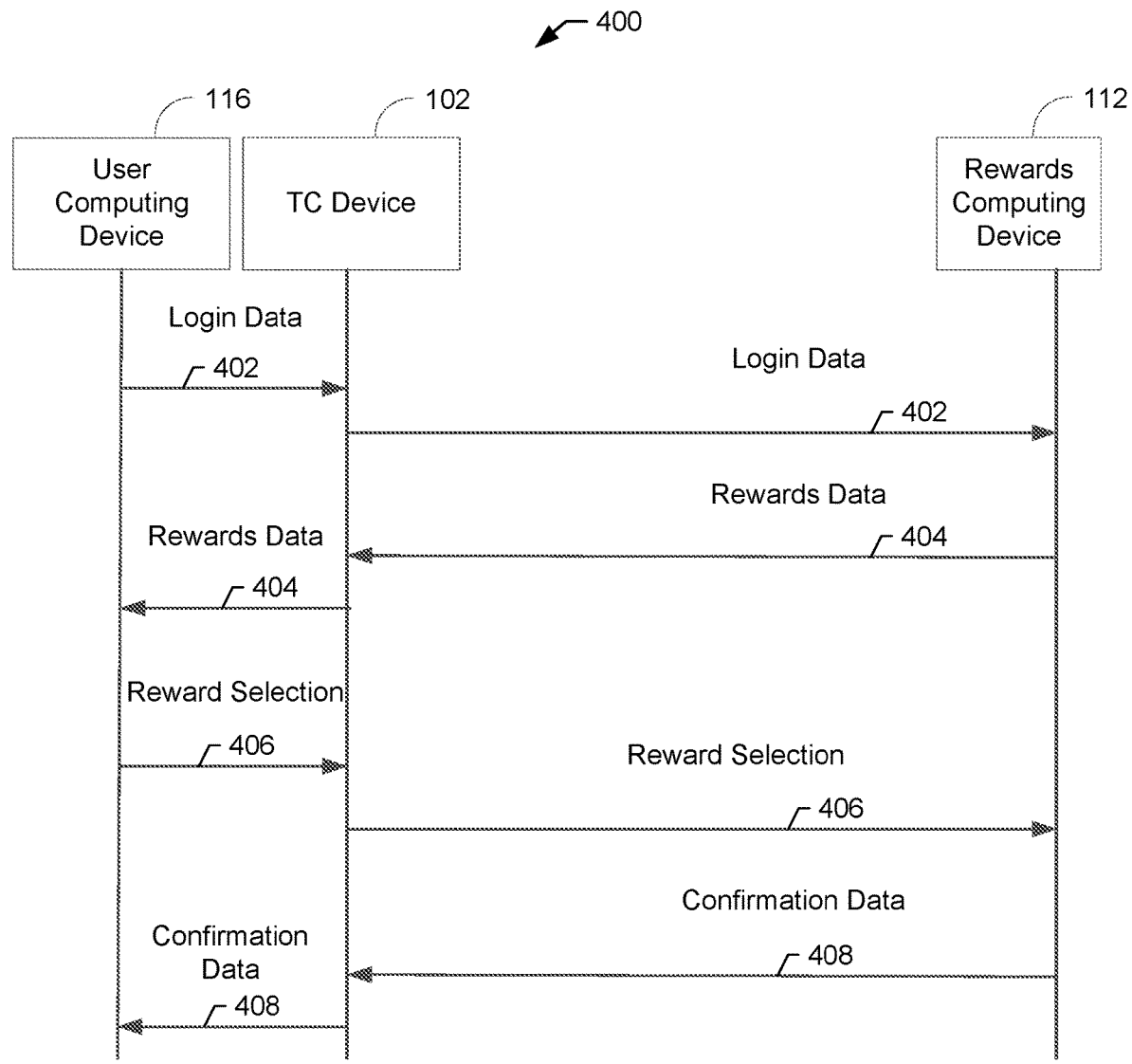

FIG. 4 is an example flow diagram 400 for redeeming reward points via the TC system shown in FIG. 1. User computing device 116 transmits login data 402 to TC device 102. TC device 102 then transmits login data 402 to rewards computing device 112 and/or otherwise requests rewards data (e.g., rewards data 404) associated with the user from rewards computing device 112. Rewards computing device 112, upon receipt of login data 402 or other request for rewards data, transmits rewards data 404 to the TC device 102. Rewards data 404 is then transmitted from TC device 102 to user computing device 116 for display to the user. Rewards data 404 may include an accrued amount of rewards or rewards points, a list of reward options, a reward redemption history, and the like (see, for example, FIG. 11).

A user can then select a reward, and user computing device 116 transmits reward selection data 406 indicating the user's selection to TC device 102. Reward selection data 406 is then transmitted to rewards computing device 112. Rewards computing device 112 then transmits reward confirmation data 408 to TC device 102. Reward confirmation data 408 is then transmitted from TC device 102 to user computing device 116 for display to the user within the TC application. Reward confirmation data 408 may include a confirmation message (see, for example, FIG. 12).

Figure 5:
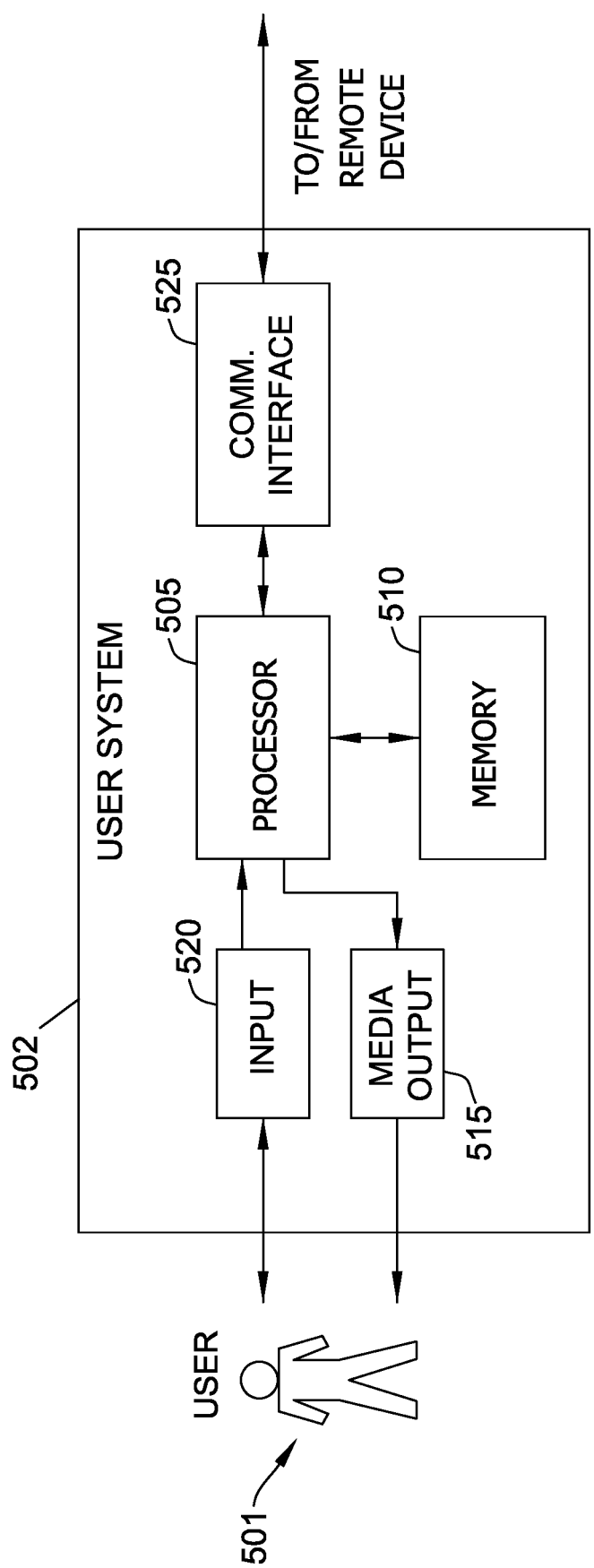

FIG. 5 illustrates an example configuration of a user system 502 operated by a user 501. In the example embodiment, user system 502 is similar to user computing device 116 and/or transportation provider computing device 104 (both shown in FIG. 1A), and may be used by user 501 to interact with TC device 102 (also shown in FIG. 1A). More specifically, user system 502 may be used to access a TC service provided by TC device 102, to receive and select travel options with associated environmental details. In the example embodiment, user system 502 includes a processor 505 for executing instructions. In some embodiments, executable instructions are stored in a memory area 510. Processor 505 may include one or more processing units, for example, a multi-core configuration. Memory area 510 is any device allowing information such as executable instructions and/or written works to be stored and retrieved. Memory area 510 may include one or more computer readable media.

User system 502 also includes at least one media output component 515 for presenting information to user 501. Media output component 515 is any component capable of conveying information to user 501. In some embodiments, media output component 515 includes an output adapter such as a video adapter and/or an audio adapter. An output adapter is operatively coupled to processor 505 and operatively couplable to an output device such as a display device, a liquid crystal display (LCD), organic light emitting diode (OLED) display, or "electronic ink" display, or an audio output device, a speaker or headphones.

In some embodiments, user system 502 includes an input device 520 for receiving input from user 501. Input device 520 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 515 and input device 520. User system 502 may also include a communication interface 525, which is communicatively couplable to a remote device, such as TC device 102 and/or transportation provider computing device 104. Communication interface 525 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 510 are, for example, computer readable instructions for providing a user interface to user 501 via media output component 515 and, optionally, receiving and processing input from input device 520. A user interface may include, among other possibilities, a web browser and client application. Web browsers enable users, such as user 501, to display and interact with media and other information typically embedded on a web page or a website from TC system 100. A client application allows user 501 to interact with a server application from TC system 100, such as TC service.

Figure 6:
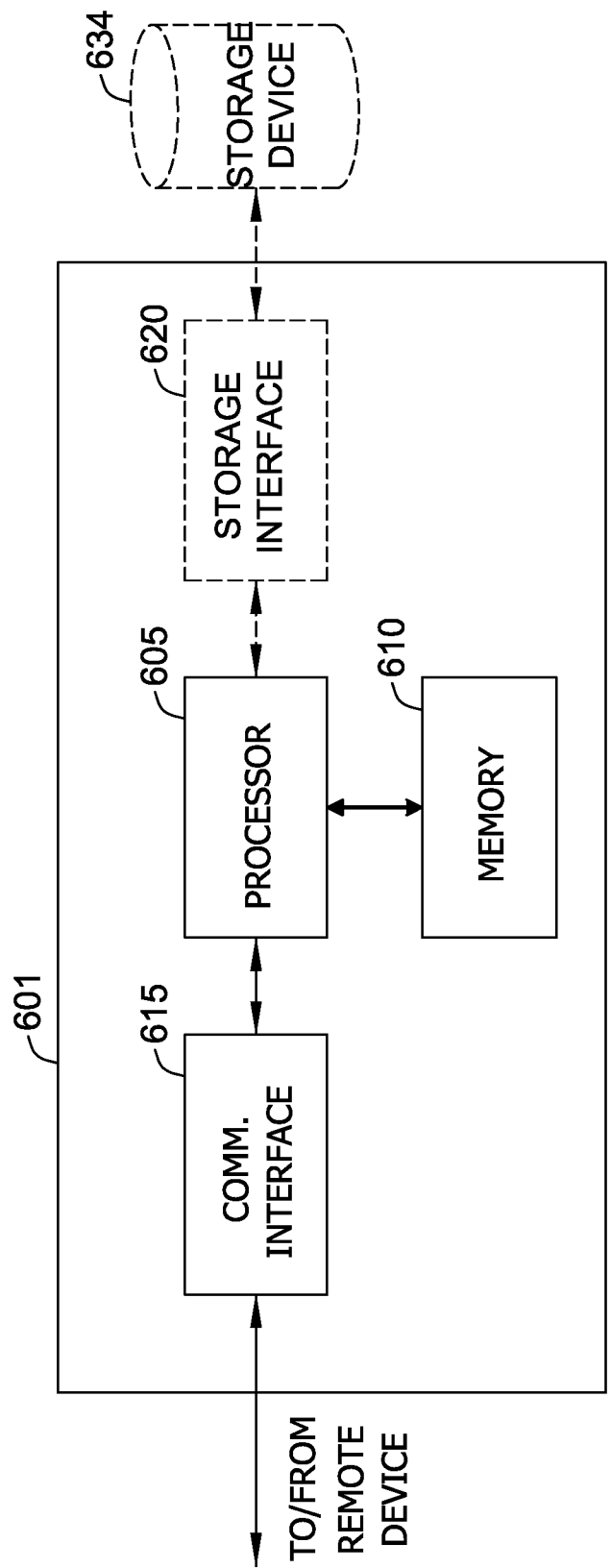

FIG. 6 illustrates an example configuration of a server system 601. Server system 601 may include, but is not limited to, TC device 102 (shown in FIG. 1A). Server system 601 includes a processor 605 for executing instructions. Instructions may be stored in a memory area 610, for example. Processor 605 may include one or more processing units (e.g., in a multi-core configuration) for executing instructions. The instructions may be executed within a variety of different operating systems on server system 601, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

Processor 605 is operatively coupled to a communication interface 615 such that server system 601 is capable of communicating with a remote device such as user system 502 (shown in FIG. 5) or another server system 601. For example, communication interface 615 may receive requests from user computing device 116 or transportation provider computing device 104 via the Internet, as illustrated in FIG. 1A.

Processor 605 may also be operatively coupled to a storage device 634. Storage device 634 is any computer-operated hardware suitable for storing and/or retrieving data. In some embodiments, storage device 634 is integrated in server system 601. For example, server system 601 may include one or more hard disk drives as storage device 634. In other embodiments, storage device 634 is external to server system 601 and may be accessed by a plurality of server systems 601. For example, storage device 634 may include multiple storage units such as hard disks or solid state disks in a redundant array of inexpensive disks (RAID) configuration. Storage device 634 may include a storage area network (SAN) and/or a network attached storage (NAS) system.

In some embodiments, processor 605 is operatively coupled to storage device 634 via a storage interface 620. Storage interface 620 is any component capable of providing processor 605 with access to storage device 634. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 634.

Figure 7:
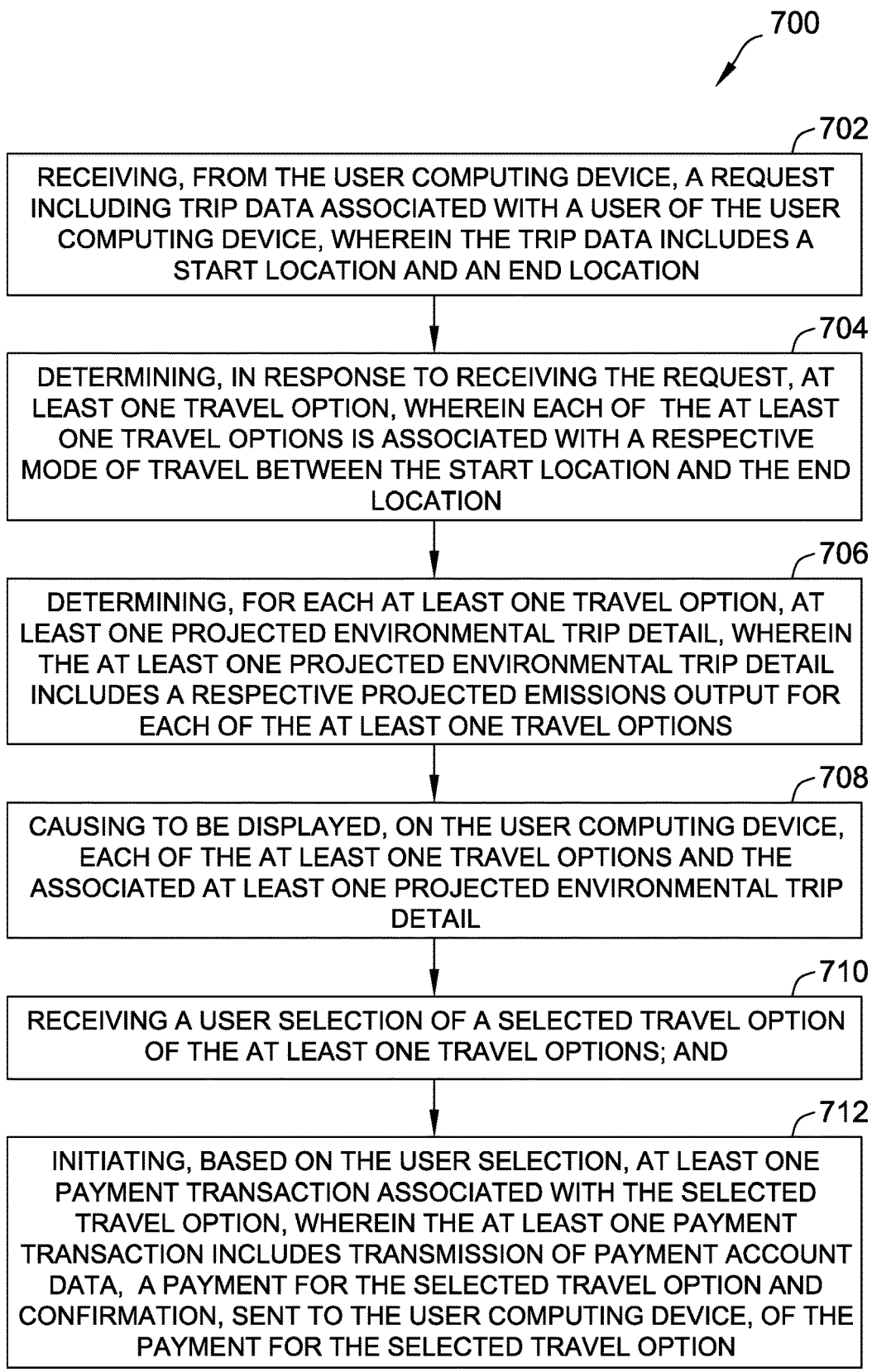

Memory area 610 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program FIG. 7 is a flow chart of an example method 700 for computing transit options with at least one projected environmental trip detail, processing user selection of an option, and rewarding the user based on the option chosen. Method 700 includes receiving 702, from user computing device 116, a request that includes trip data associated with a user of user computing device 116, wherein the trip data includes a start location and an end location. Method 700 also includes determining 704, in response to receiving the request, at least one travel option, wherein each of the at least one travel options is associated with a respective mode of travel between the start location and the end location. Method 700 further includes determining 706, for each of the at least one travel options, at least one projected environmental trip detail, wherein the at least one projected environmental trip detail includes a respective projected emissions output for each at least one travel option and causing to be displayed 708, on user computing device 116, each of the at least one travel options and the associated at least one projected environmental trip detail. Method 700 also includes receiving 710 a user selection of a selected travel option of the at least one travel option, and initiating 712, based on the user selection, at least one payment transaction associated with the selected travel option, wherein the at least one transaction includes transmission of payment account data, a payment for the selected travel option and confirmation, sent to the user computing device, of the payment for the selected travel option.

In some embodiments, method 700 may further include receiving, from user computing device 116, registration data 202, wherein the registration data 202 includes user account information and registering, upon receipt of registration data 202 from user computing device 116, the user with TC system 100. Method 700 may also include awarding a user, based on the user-selected travel option, a number of reward points wherein the number of reward points awarded to the user corresponds to the projected environmental trip detail associated with the selected travel option and wherein the reward points may be redeemed for a reward such as a discount on a future transaction associated with a future travel option.

In further embodiments, method 700 may include, upon receipt of a selected travel option including more than one mode of travel, generating an authorization request associated with each merchant associated with each mode of travel included in the selected travel option and transmitting each authorization request to a payment card interchange network. Method 700 may also include initiating confirmation sent to user computing device 116 of the payment for the selected travel option including separate confirmations for each mode of travel included in the selected travel option.

Figure 8:
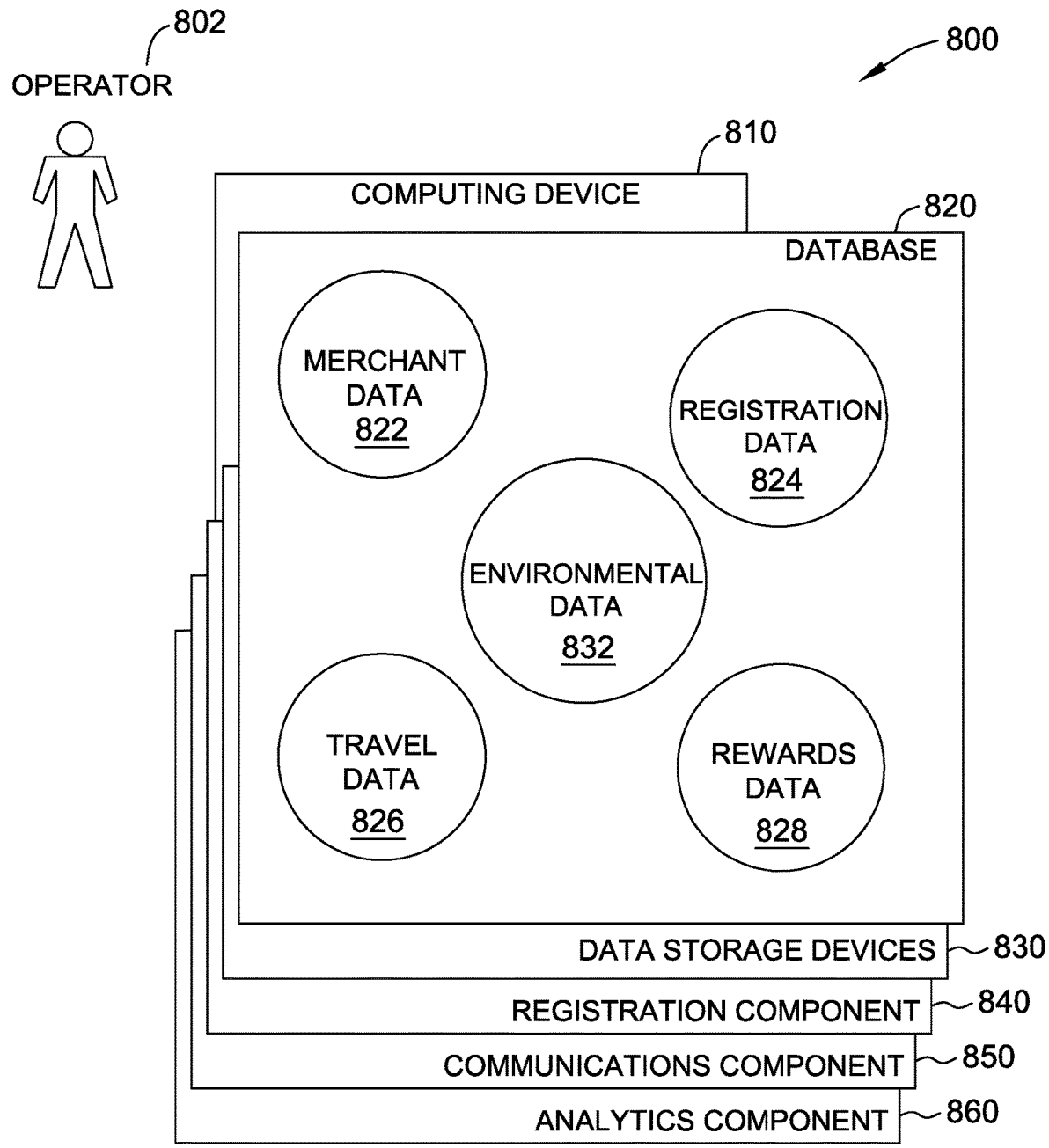

FIG. 8 is a diagram 800 of computer components of one or more example computing devices that may be used in transit computing (TC) system 100, as shown in FIGS. 1A and 1B. In some embodiments, computing device 810 is used to implement transit computing device 102 (shown in FIG. 1A). The computer components may be used to monitor the location of a user computing device, such as user computing device 116 (shown in FIG. 1A). Operator 802 (such as a user operating TC device 102) may access computing device 810 in order to service computing device 810. In some embodiments, database 820 is similar to database 118 and/or database 110 (as shown in FIG. 1A). Database 820 may be coupled with several separate components within computing device 810, which perform specific tasks. In the example embodiment, database 820 includes merchant data 822, registration data 824, travel data 826, rewards data 828, and environmental data 832.

Computing device 810 includes database 820, as well as storage devices 830, for storing data within database 820, such as storing merchant data 822, registration data 824, travel data 826, rewards data 828, and environmental data 832. Computing device 810 also includes registration component 840 for registering a customer with a transit computing (TC) service using registration data received from user computing device 116 associated with the customer. Computing device 810 further includes communications component 850 for receiving 702 (shown in FIG. 7), from user computing device 116, trip data associated with a trip of the customer.

Computing device 810 further includes analytics component 860 for, as examples, determining 704 (shown in FIG. 7) at least one travel option, and determining 706 (shown in FIG. 7), for each at least one travel option, at least one projected environmental trip detail.

Figure 9:
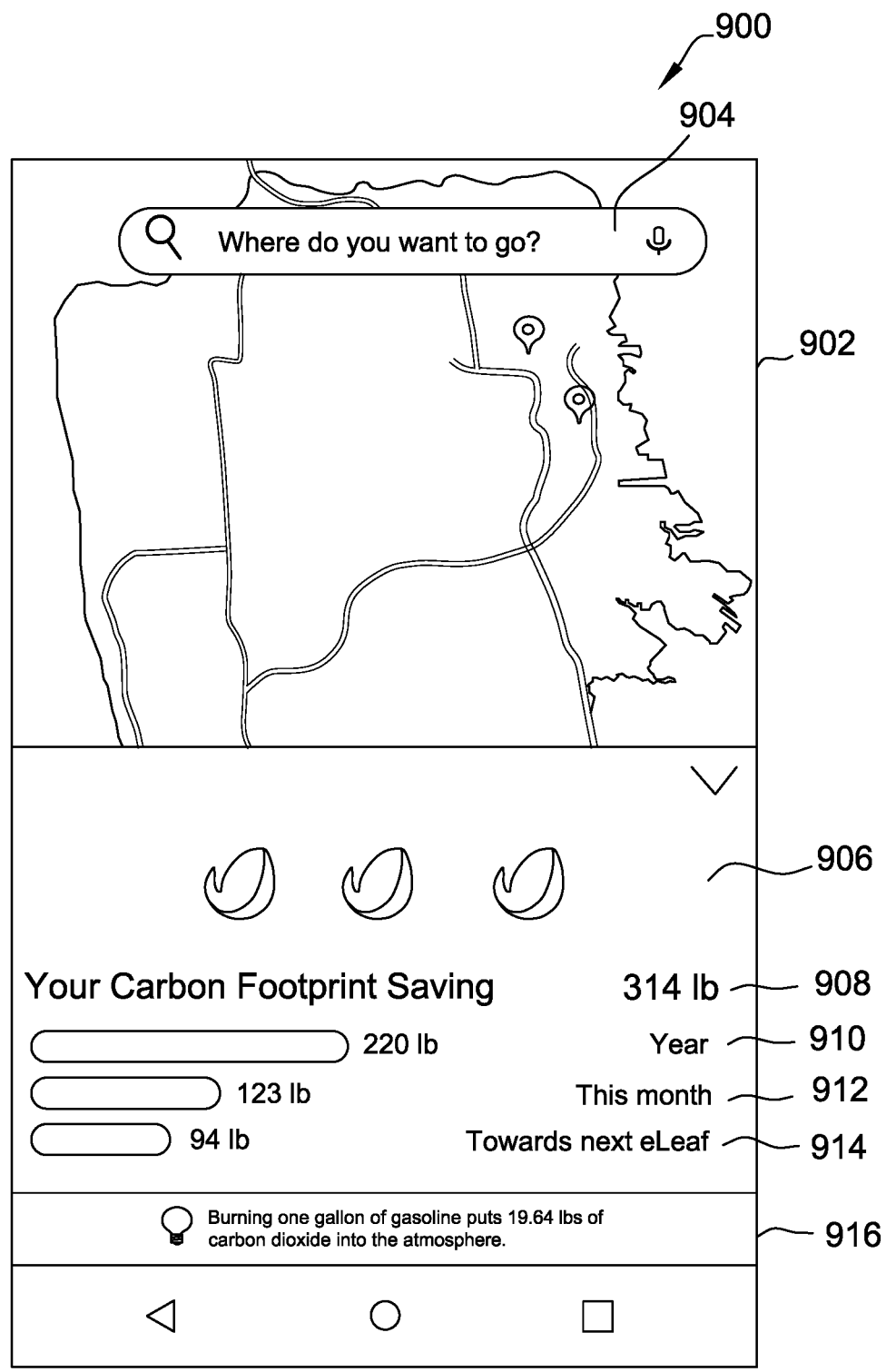

FIG. 9 illustrates an example embodiment of a screenshot 900 of a user interface displayed on user computing device 116 (shown in FIG. 1A) illustrating user input of trip data (e.g., trip data 206. shown in FIG. 2). A map 902 is displayed based on a current user location that may be determined by a user computing device's 116 location system, such as a global positioning system (GPS) sensor. Map 902 may also be displayed based on input trip data, such an input start location and/or end location of a trip. A search bar 904 allows a user to enter the trip data. Reward images 906 indicate the amount of rewards compiled by a user from at least one trip they purchased using TC system 100, while environmental data 908, 910, 912, and 914 indicate user environmental data over various periods of time (e.g., a month, a year, etc.). Environmental statement 916 encourages a user to be more environmentally friendly by indicating an environmental fact.

FIG. 10 illustrates an example embodiment of a screenshot 1000 of a user interface displayed on user computing device 116 (shown in FIG. 1A) illustrating user selection from a plurality of travel options. A map 1002 provides information, such as nearby roads, landmarks, and/or potential destinations, based on a user location. Search bars 1004 and 1006 allow a user to enter trip data (e.g. trip data 206, shown in FIG. 2), such as a starting location and end location. Enhanced travel option data (e.g. enhanced travel option data 210, shown in FIG. 2) is represented by a plurality of travel options 1008 and a plurality of projected environmental trip details 1010, wherein each projected environmental trip detail is associated with at least one of the plurality of travel options 1008. Environmental icon 1012 indicates which environmental detail is being displayed in the plurality of environmental trip details 1010. In some embodiments, the plurality of travel options 1008 may be displayed in order of least environmental impact to greatest environmental impact (e.g., from left to right). In other embodiments, the plurality of travel options may be displayed in order of least travel time to most travel time or according to any other relevant characteristic. Pay icon 1014 represents an icon than can be pressed by a user to initiate, at TC device 102, at least one transaction associated with a selected travel option.

Figure 11:
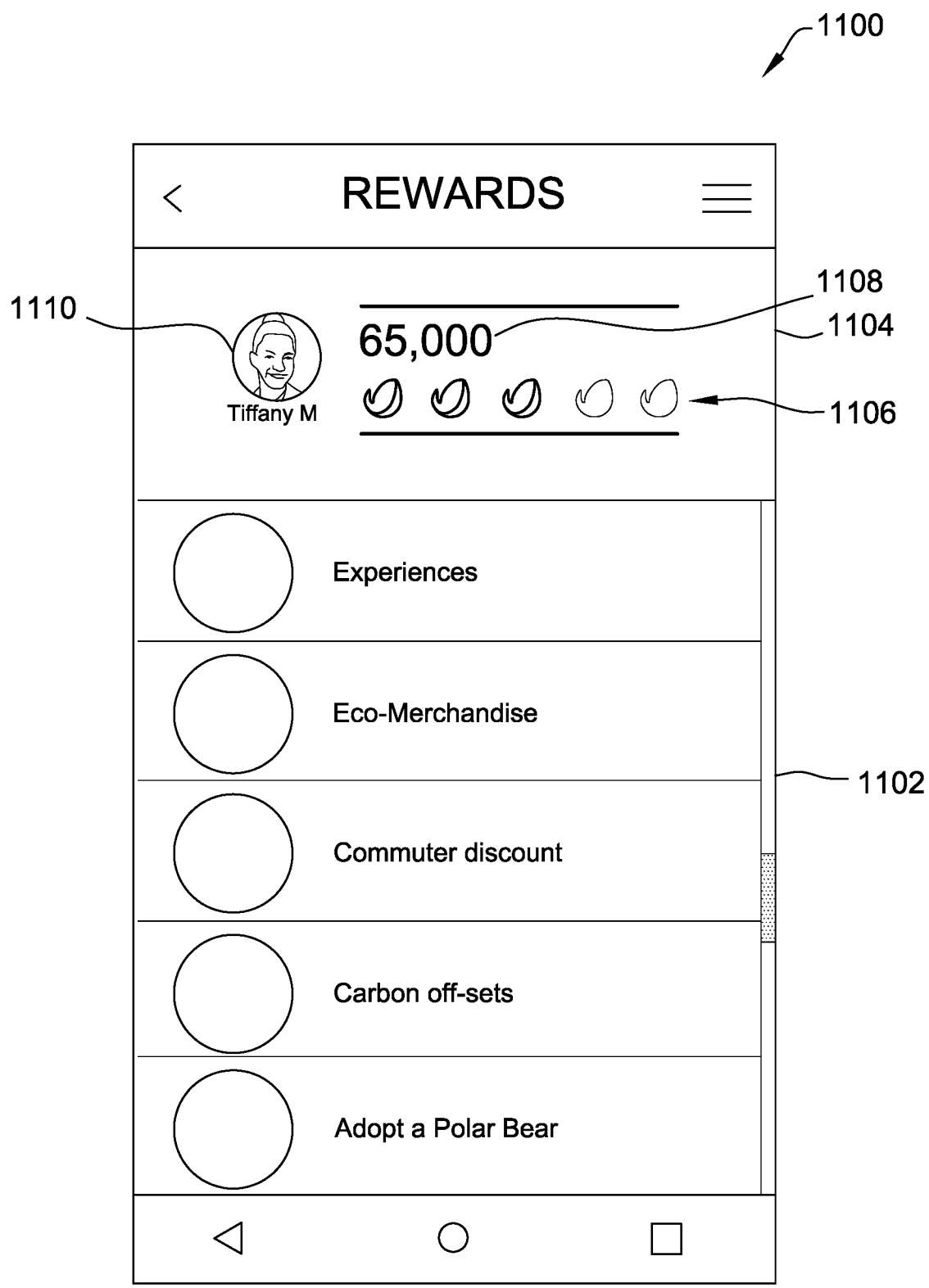

FIG. 11 illustrates an example embodiment 1100 of a user interface displayed on a user computing device 116 illustrating a user selection from a plurality of reward options 1102. Reward options 1102 indicate a variety of rewards that can be selected by a user. Rewards data 1104 indicates a user's current rewards data. In some embodiments, rewards data 1104 may be displayed by a number of reward points 1108 and/or at least one rewards icon 1106. In this embodiment, three rewards icons 1106 are emboldened/filled in, and more icons will be emboldened/filled in upon the user receiving more reward points 1108. Image 1110 indicates which user profile the rewards data 1104 is associated with.

Figure 12:
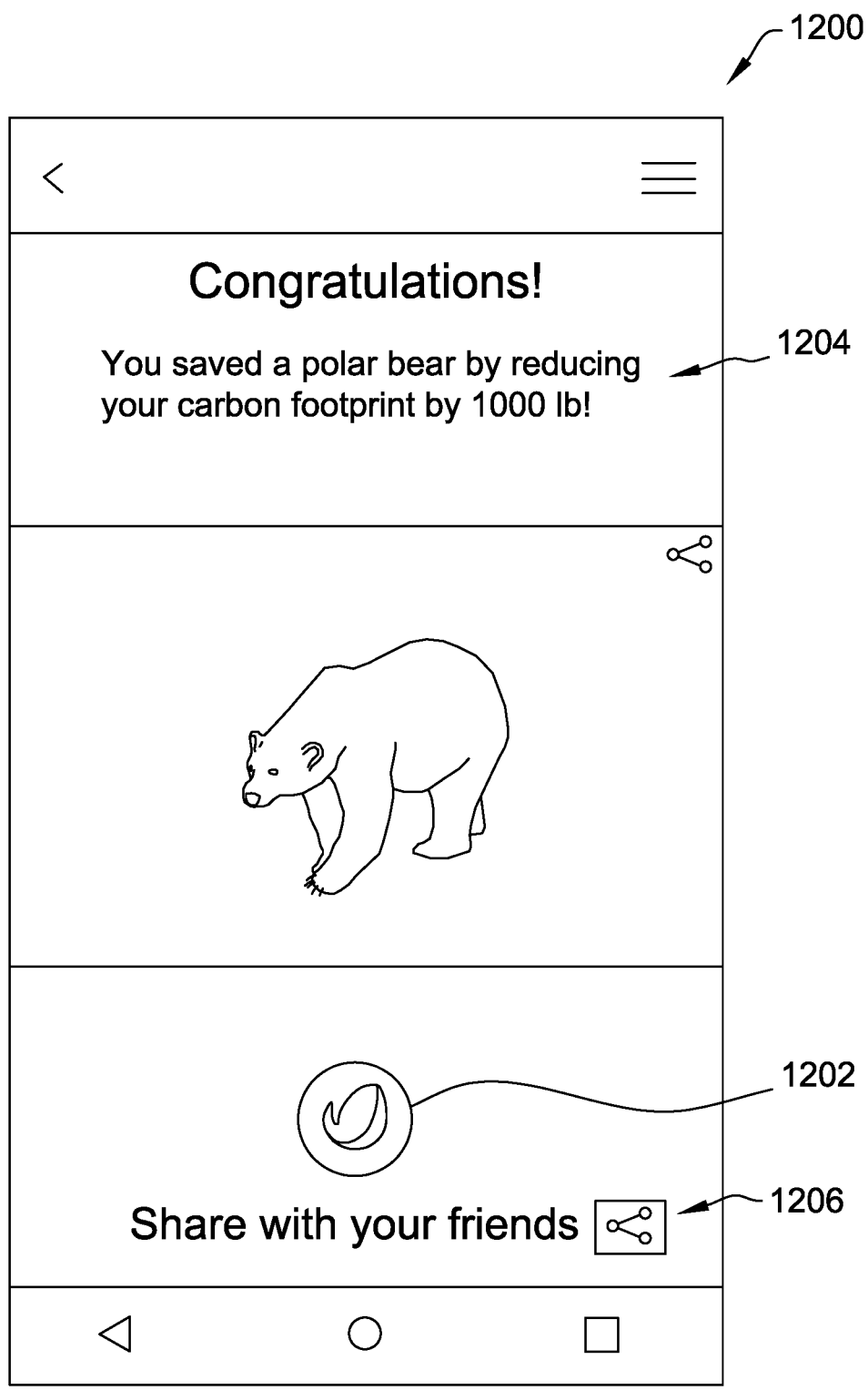

FIG. 12 illustrates an example embodiment 1200 of a user interface displayed on a user computing device 116 illustrating confirmation of a reward selected by a user. An image 1202 indicates a user has earned a new reward. A message 1204 indicates the environmental impact of the reward the user has chosen. Link 1206 offers the user the option of sharing their reward confirmation elsewhere.

Embodiments described herein may relate to a transaction card system, such as a credit card payment system using the Mastercard® interchange network. The Mastercard® interchange network is a set of proprietary communications standards promulgated by Mastercard International Incorporated® for the exchange of financial transaction data and the settlement of funds between financial institutions that are members of Mastercard International Incorporated®. (Mastercard is a registered trademark of Mastercard International Incorporated located in Purchase, N.Y.).

In an example multi-party transaction card industry system enabling ordinary payment-by-card transactions in TC system 100, including payment-by-card transactions made by cardholders, such as a cardholder, using user computing devices, such as user computing device 116 (shown in FIG. 1A), to initiate transactions with a merchant, merchants (e.g., a transportation provider associated with transportation provider computing device 104 (shown in FIG. 1A)), and card issuers (e.g., a card issuer associated with issuer computing device 106 (shown in FIG. 1A)) do not need to have a one-to-one special relationship when processing transactions. Typical financial transaction institutions provide a suite of interactive, online applications to both current and prospective customers. For example, a financial transactions institution may have a set of applications that provide informational and sales information on their products and services to prospective customers, as well as another set of applications that provide account access for existing cardholders.

In a typical transaction card system, a financial institution called the "issuer" issues a transaction card, such as a credit card, to a customer or cardholder, who uses the transaction card to tender payment for a purchase from a merchant. A cardholder may purchase goods and services ("products") at a merchant. The cardholder may make such purchases using virtual forms of the transaction card and, more specifically, by providing data related to the transaction card (e.g., the transaction card number, expiration date, associated postal code, and security code) to initiate transactions. To accept payment with the transaction card or virtual forms of the transaction card, the merchant must normally establish an account with a financial institution that is part of the financial payment system. This financial institution is usually called the "merchant bank," the "acquiring bank," or the "acquirer." When the cardholder tenders payment for a purchase with a transaction card or virtual transaction card, the merchant requests authorization from a merchant bank for the amount of the purchase (e.g., transaction amount). The request may be performed over the telephone or electronically, but is usually performed through the use of a point-of-sale terminal, which reads the cardholder's account information from a magnetic stripe, a chip, or embossed characters on the transaction card and communicates electronically with the transaction processing computers of merchant bank. The merchant receives cardholder's account information as provided by cardholder. Alternatively, the merchant bank may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network (e.g., payment network 108 (shown in FIG. 1A)), computers of a merchant bank or a merchant processor will communicate with computers of an issuer bank to determine whether cardholder's account is in good standing and whether the purchase is covered by cardholder's available credit line. Based on these determinations, the request for authorization will be declined or accepted in an authorization response message (e.g. authorization response 306 shown in FIG. 3). If the request is accepted, an authorization code is issued to merchant.

When a request for authorization is accepted, the available credit line of cardholder's account is decreased. Normally, a charge for a payment card transaction is not posted immediately to cardholder's account because bankcard associations, such as MasterCard International Incorporated®, have promulgated rules that do not allow merchant to charge, or "capture," a transaction until products are shipped or services are delivered. However, with respect to at least some debit card transactions, a charge may be posted at the time of the transaction. When the merchant ships or delivers the products or services, the merchant captures the transaction by, for example, appropriate data entry procedures on the point-of-sale terminal. This may include bundling of approved transactions daily for standard retail purchases. If the cardholder cancels a transaction before it is captured, a "void" is generated. If the cardholder returns products after the transaction has been captured, a "credit" is generated. An interchange network and/or an issuer bank stores the transaction card information, such as a type of merchant, amount of purchase, date of purchase, in a database 118 (shown in FIG. 1A).

After a purchase has been made, a clearing process occurs to transfer additional transaction data related to the purchase among the parties to the transaction, such as the merchant bank, the interchange network, and the issuer bank. More specifically, during and/or after the clearing process, additional data, such as a time of purchase, a merchant name, a type of merchant, purchase information, cardholder account information, a type of transaction, information regarding the purchased item and/or service, and/or other suitable information, is associated with a transaction and transmitted between parties to the transaction as transaction data, and may be stored by any of the parties to the transaction. In the example embodiment, transaction data including such additional transaction data may also be provided to systems including transit computing (TC) device 102. In the example embodiment, interchange network provides such transaction data and additional transaction data. In alternative embodiments, any party may provide such data to TC device 102.

After a transaction is authorized and cleared, the transaction is settled among the merchant, the merchant bank, and the issuer bank. Settlement refers to the transfer of financial data or funds among merchant's account, merchant bank, and issuer bank related to the transaction. Usually, transactions are captured and accumulated into a "batch," which is settled as a group. More specifically, a transaction is typically settled between issuer bank and interchange network, and then between interchange network and merchant bank, and then between merchant bank and merchant.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, computer-executable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

In addition, although various elements of the transit computing (TC) device are described herein as including general processing and memory devices, it should be understood that the TC device is a specialized computer configured to perform the steps described herein for providing an all-in-one service wherein a user trip is planned, environmental impact data is provided, and associated user transactions are processed.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal language of the claims.

What is claimed is:

1. A transit computing system for determining travel options, the transit computing system comprising at least one transit computing device including at least one processor communicatively coupled to a database, the at least one processor configured to:

cause to be displayed, on a user computing device, a plurality of environmental images, wherein the plurality of environmental images are associated with accumulations of emissions savings over different periods of time;

receive, via the Internet from a user interface executing on the user computing device, a request including trip data associated with a user of the user computing device, wherein the trip data comprises a start location and an end location;

in response to receiving the request, automatically:
determine a plurality of travel options, wherein each of the travel options is associated with a respective mode of travel between the start location and the end location;
determine, for each of the travel options, at least one projected environmental trip detail, wherein the at least one projected environmental trip detail comprises a respective projected emissions output for each of the travel options;
generate enhanced travel option data comprising an ordered sequence of the travel options based at least in part upon the respective projected emissions output for each of the travel options;
cause to be displayed, on the user interface via the Internet, a plurality of icons, each icon representing a corresponding one of the travel options, the plurality of icons arranged in the ordered sequence of the corresponding travel options; and
cause to be displayed, via the Internet on the user interface adjacent to each of the icons, the determined at least one projected environmental trip detail of the travel option corresponding to the respective icon;
receive, via the Internet from the user interface, a user selection of one of the icons corresponding to a selected travel option;
transmit, via a payment processing network in response to the user selection, an authorization request message for payment for the selected travel option, the authorization request message formatted according to a proprietary communications standard promulgated by the payment processing network for exchange of financial transaction data and settlement of funds between financial institutions that are members of the payment processing network;
transmit, via the Internet to the user interface, a confirmation of the payment for the selected travel option;
determine to award a number of reward points upon receipt, at the transit computing device, of confirmation data confirming the user has completed travel associated with the selected travel option;
award the number of reward points based on the selected travel option, wherein the number of reward points awarded corresponds to the respective projected emissions output associated with the selected travel option; and
update display of at least one of the plurality of environmental images based upon the respective projected emissions output.

2. The transit computing system of claim 1 wherein the processor is further configured to:
receive, from the user computing device, registration data, wherein the registration data includes user account information; and
register, upon receipt of registration data from the user computing device, the user with the transit computing system.

3. The transit computing system of claim 1, wherein the user computing device comprises a cell phone.

4. The transit computing system of claim 1, wherein the reward points accumulated by the user may be redeemed for a reward.

5. The transit computing system of claim 1, wherein upon receipt of a selected travel option including more than one mode of travel, the at least one processor is further configured to generate an authorization request associated with each merchant associated with each mode of travel included in the selected travel option and transmit each authorization request to the payment processing network.

6. The transit computing system of claim 5, wherein the confirmation sent to the user computing device of the payment for the selected travel option comprises separate confirmations for each mode of travel included in the selected travel option.

7. A computer-implemented method for determining travel options, the method implemented by at least one transit computing device including at least one processor in communication with at least one database, the method comprising:
causing to be displayed, on a user computing device, a plurality of environmental images, wherein the plurality of environmental images are associated with accumulations of emissions savings over different periods of time;
receiving, via the Internet from a user interface executing on the user computing device, a request including trip data associated with a user of the user computing device, wherein the trip data comprises a start location and an end location;
in response to receiving the request, automatically:
determining a plurality of travel options, wherein each of the travel options is associated with a respective mode of travel between the start location and the end location;
determining, for each of the travel options, at least one projected environmental trip detail, wherein the at least one projected environmental trip detail comprises a respective projected emissions output for each of the travel options;
generating enhanced travel option data comprising an ordered sequence of the travel options based at least in part upon the respective projected emissions output for each of the travel options;
causing to be displayed, on the user interface via the Internet, a plurality of icons, each icon representing a corresponding one of the travel options, the plurality of icons arranged in the ordered sequence of the corresponding travel options; and
causing to be displayed, via the Internet on the user interface adjacent to each of the icons, the determined at least one projected environmental trip detail of the travel option corresponding to the respective icon;
receiving, via the Internet from the user interface, a user selection of one of the icons corresponding to a selected travel option;
transmitting, via a payment processing network in response to the user selection, an authorization request message for payment for the selected travel option, the authorization request message formatted according to a proprietary communications standard promulgated by the payment processing network for exchange of financial transaction data and settlement of funds between financial institutions that are members of the payment processing network;
transmitting, via the Internet to the user interface, a confirmation, sent to the user computing device, of the payment for the selected travel option;
determining to award a number of reward points upon receipt, at the transit computing device, of confirmation data confirming the user has completed travel associated with the selected travel option;
awarding the number of reward points based on the selected travel option, wherein the number of reward points awarded corresponds to the respective projected emissions output associated with the selected travel option; and
updating display of at least one of the plurality of environmental images based upon the respective projected emissions output.

8. The method of claim 7 wherein the method further comprises:

receiving, from the user computing device, registration data, wherein the registration data includes user account information; and registering, upon receipt of registration data from the user computing device, the user with the transit computing device.

9. The method of claim 7, wherein the user computing device comprises a cell phone.

10. The method of claim 7, wherein the reward points accumulated by the user may be redeemed for a reward.

11. The method of claim 7, wherein the method further comprises, upon receipt of a selected travel option including more than one mode of travel, generating an authorization request associated with each merchant associated with each mode of travel included in the selected travel option and transmitting each authorization request to the payment processing network.

12. The method of claim 11, wherein the method further comprises initiating confirmation sent to the user computing device of the payment for the selected travel option including separate confirmations for each mode of travel included in the selected travel option.

13. A non-transitory computer-readable storage medium having computer-executable instructions embodied thereon, wherein when executed by at least one transit computing device, including at least one processor in communication with at least one database, the computer-executable instructions cause the transit computing device to:

cause to be displayed, on a user computing device, a plurality of environmental images, wherein the plurality of environmental images are associated with accumulations of emissions savings over different periods of time;

receive, via the Internet from a user interface executing on the user computing device, a request including trip data associated with a user of the user computing device, wherein the trip data comprises a start location and an end location;

in response to receiving the request, automatically:

determine a plurality of travel options, wherein each of the travel options is associated with a respective mode of travel between the start location and the end location;

determine, for each of the travel options, at least one projected environmental trip detail, wherein the at least one projected environmental trip detail comprises a respective projected emissions output for each of the travel options;

generate enhanced travel option data comprising an ordered sequence of the travel options based at least in part upon the respective projected emissions output for each of the travel options;

cause to be displayed, on the user interface via the Internet, a plurality of icons, each icon representing a corresponding one of the travel options, the plurality of icons arranged in the ordered sequence of the corresponding travel options; and cause to be displayed, via the Internet on the user interface adjacent to each of the icons, the determined at least one projected environmental trip detail of the travel option corresponding to the respective icon;

receive, via the Internet from the user interface, a user selection of one of the icons corresponding to a selected travel option;

transmit, via a payment processing network in response to the user selection, an authorization request message for payment for the selected travel option, the authorization request message formatted according to a proprietary communications standard promulgated by the payment processing network for exchange of financial transaction data and settlement of funds between financial institutions that are members of the payment processing network;

transmit, via the Internet to the user interface, a confirmation of the payment for the selected travel option;

determine to award a number of reward points upon receipt, at the transit computing device, of confirmation data confirming the user has completed travel associated with the selected travel option;

award the number of reward points based on the selected travel option, wherein the number of reward points awarded corresponds to the respective projected emissions output associated with the selected travel option; and update display of at least one of the plurality of environmental images based upon the respective projected emissions output.

14. The computer-readable storage medium of claim 13, wherein the computer-executable instructions further cause the transit computing device to:

receive, from the user computing device, registration data, wherein the registration data includes user account information; and register, upon receipt of registration data from the user computing device, the user with the transit computing device.

15. The computer-readable storage medium of claim 13, wherein the user computing device comprises a cell phone.

16. The computer-readable storage medium of claim 13, wherein the computer-executable instructions further cause the transit computing device to, upon receipt of a selected travel option including more than one mode of travel, generate an authorization request associated with each merchant associated with each mode of travel included in the selected travel option and transmit each authorization request to the payment processing network.

17. The computer-readable storage medium of claim 16, wherein the confirmation sent to the user computing device of the payment for the selected travel option comprises separate confirmations for each mode of travel included in the selected travel option.

* * * * *